(12) United States Patent
Mugino et al.

(10) Patent No.: US 8,179,747 B1
(45) Date of Patent: May 15, 2012

(54) THERMALLY ASSISTED MAGNETIC HEAD

(75) Inventors: Yoichi Mugino, Kyoto (JP); Tsuguki Noma, Kyoto (JP); Minoru Akutsu, Kyoto (JP); Koji Shimazawa, Tokyo (JP)

(73) Assignees: Rohm Co., Ltd., Kyoto (JP); TDK Corporation, Tokyo (JP)

( * ) Notice: Subject to any disclaimer, the term of this patent is extended or adjusted under 35 U.S.C. 154(b) by 0 days.

(21) Appl. No.: 13/036,590

(22) Filed: Feb. 28, 2011

(51) Int. Cl.
  *G11B 11/00* (2006.01)
(52) U.S. Cl. .............. 369/13.33; 369/112.27; 360/59
(58) Field of Classification Search ......... 369/13.33, 369/13.32, 13.24, 13.14, 13.03, 13.02, 13.12, 369/112.27, 112.09, 112.14, 112.21; 360/59, 360/313, 245.3, 126, 123.17, 125.31, 128, 360/125.74, 125.02
See application file for complete search history.

(56) References Cited

U.S. PATENT DOCUMENTS

| | | | |
|---|---|---|---|
| 6,768,556 B1 | 7/2004 | Matsumoto et al. | |
| 7,804,655 B2 | 9/2010 | Shimazawa et al. | |
| 7,898,909 B2 * | 3/2011 | Shimazawa et al. | 369/13.33 |
| 8,000,175 B2 * | 8/2011 | Shimazawa et al. | 369/13.13 |
| 2001/0017820 A1 | 8/2001 | Akiyama et al. | |
| 2001/0021211 A1 | 9/2001 | Ueyanagi | |
| 2002/0167870 A1 | 11/2002 | Akiyama et al. | |
| 2004/0081031 A1 | 4/2004 | Saga et al. | |
| 2004/0194119 A1 | 9/2004 | Miyanishi et al. | |
| 2005/0018547 A1 | 1/2005 | Akiyama et al. | |
| 2005/0122849 A1 | 6/2005 | Ueyanagi | |
| 2006/0215717 A1 | 9/2006 | Shigihara et al. | |
| 2008/0043360 A1 | 2/2008 | Shimazawa et al. | |
| 2009/0122659 A1 | 5/2009 | Ueyanagi | |
| 2009/0129212 A1 | 5/2009 | Ueyanagi | |
| 2009/0129213 A1 | 5/2009 | Ueyanagi | |

FOREIGN PATENT DOCUMENTS

| | | |
|---|---|---|
| JP | 10-162444 | 6/1998 |
| JP | 2000-173093 | 6/2000 |
| JP | 2001-255254 | 9/2001 |
| JP | 2001-283404 | 10/2001 |
| JP | 2001-325756 | 11/2001 |
| JP | 2002-298302 | 10/2002 |
| JP | 2004-158067 | 6/2004 |
| JP | 2004-303299 | 10/2004 |
| JP | 2006-269581 | 10/2006 |
| WO | WO 92/02931 | 2/1992 |
| WO | WO 98/09284 | 3/1998 |
| WO | WO 99/53482 | 10/1999 |

OTHER PUBLICATIONS

"Near Field Assisted Magnetic Recording," Shintaro Miyanishi et al.; IEEE Transactions on Magnetics, vol. 41, No. 10, Oct. 2005, pp. 2817-2821.
"Status and Problems of Thermally Assisted Magnetic Recording," Keiji Shono et al.; Journal of the Magnetics Society of Japan, 2005, vol. 9, No. 1, pp. 5-13.
"Retractive index of $Al_xGa_{1-x}As$ between 1.2 and 1.8 eV," Applied Physics Letters, 1974, vol. 24, No. 2, pp. 63-65.

* cited by examiner

*Primary Examiner* — Ali Neyzari
(74) *Attorney, Agent, or Firm* — Rabin & Berdo, PC

(57) ABSTRACT

A thermally assisted magnetic head includes a slider and a light source unit. The light source unit includes a semiconductor laser diode. The semiconductor laser diode includes an n-type $(Al_{x1}Ga_{(1-x1)})_{0.51}In_{0.49}P$ cladding layer, a p-type $(Al_{x1}Ga_{(1-x1)})_{0.51}In_{0.49}P$ cladding layer, an n-side $Al_{x2}Ga_{(1-x2)}As$ guide layer placed between these cladding layers, a p-side $Al_{x2}Ga_{(1-x2)}As$ guide layer placed between these cladding layers, and an active layer placed between these guide layers.

8 Claims, 16 Drawing Sheets

FIG. 1
(a)
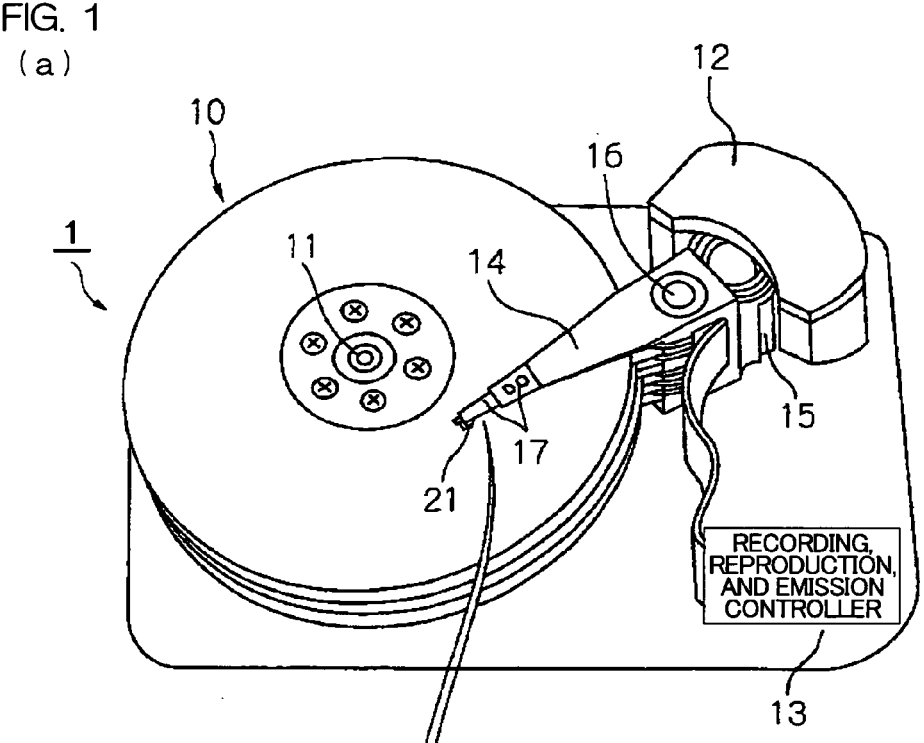
(b)
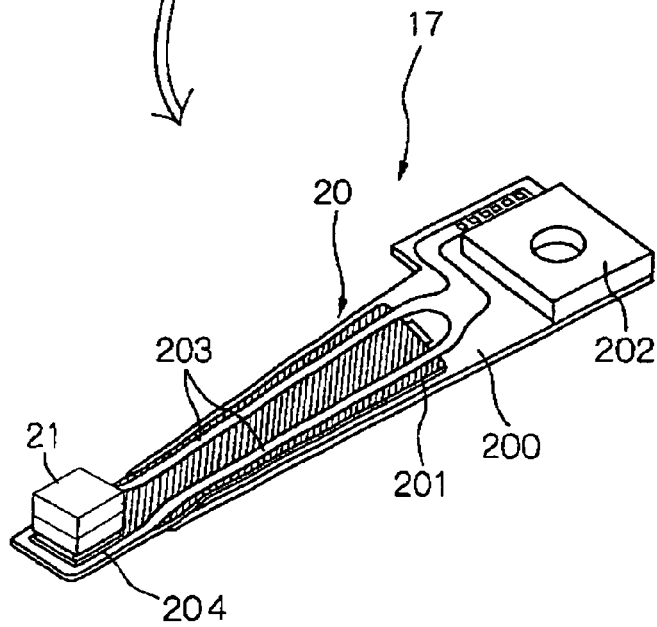

TRACK WIDTH
DIRECTION

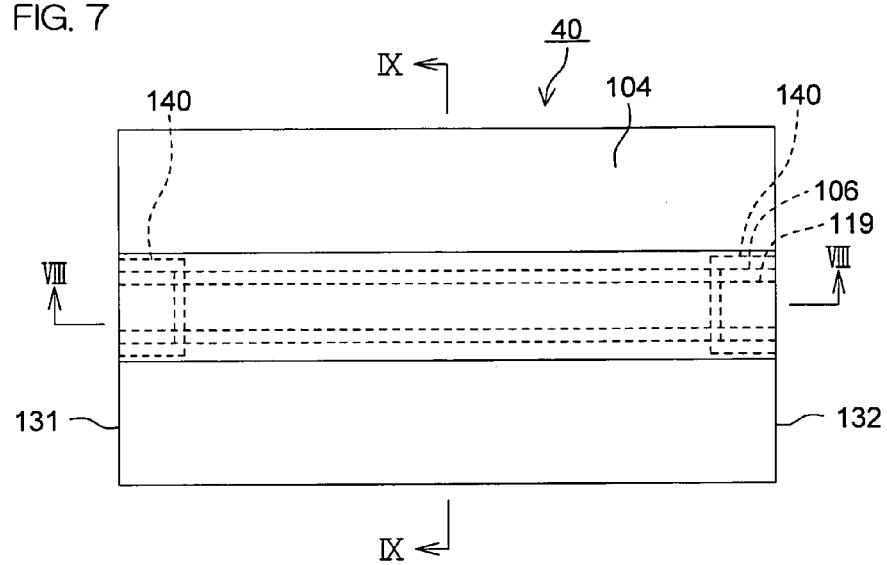
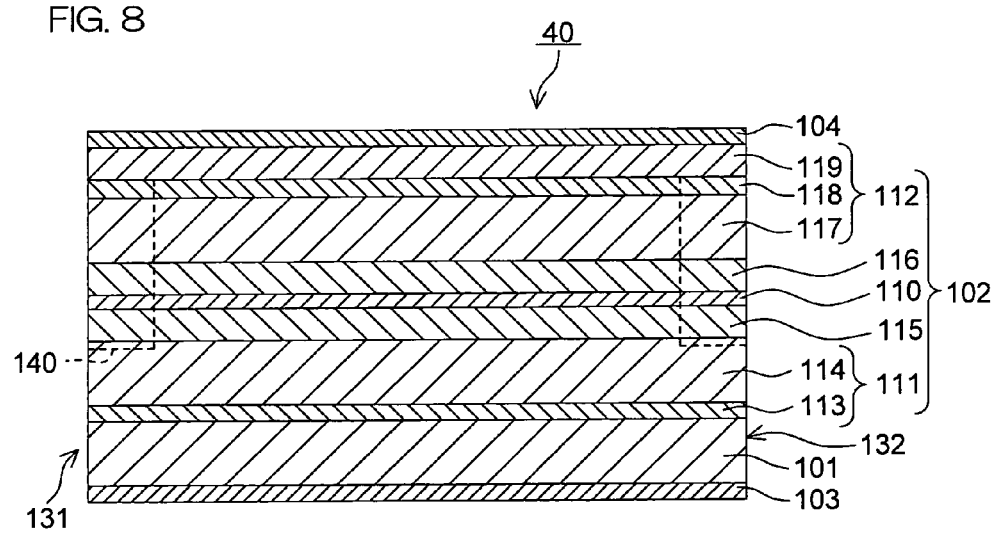

FIG. 21
(a)
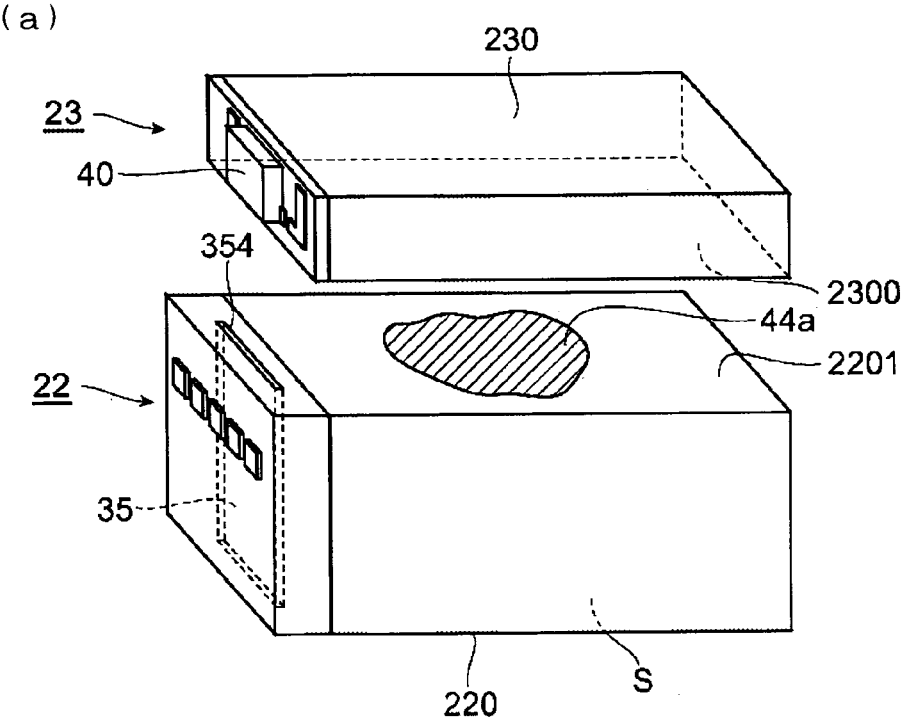
(b)
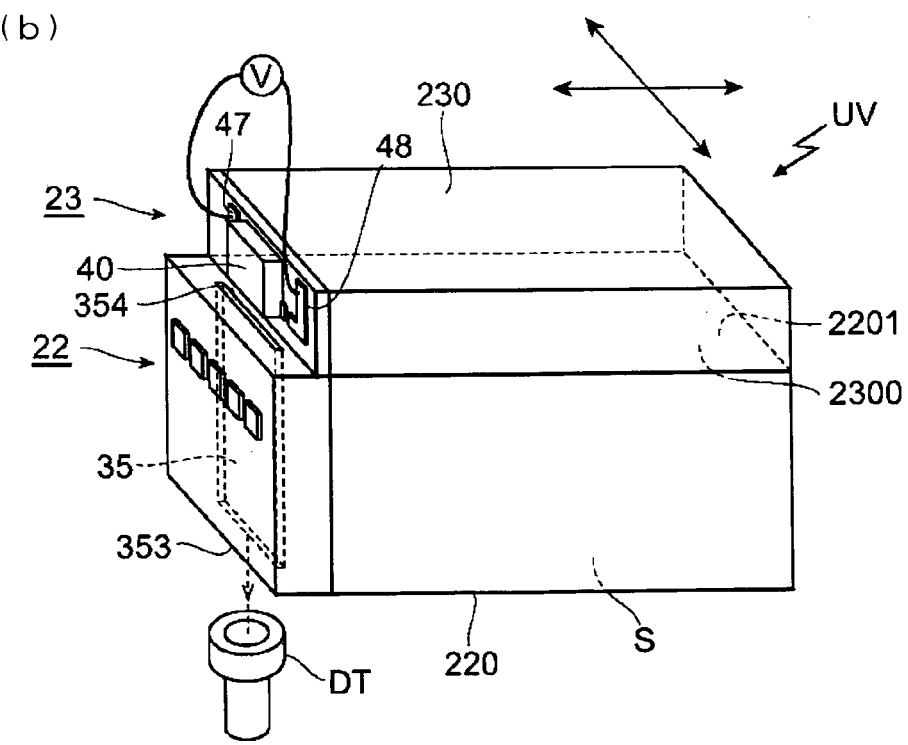

THERMALLY ASSISTED MAGNETIC HEAD

BACKGROUND OF THE INVENTION

1. Field of the Invention

This invention relates to a thermally assisted magnetic head for writing of signals by a thermally assisted magnetic recording method.

2. Description of the Related Art

As the recording density of a hard disk drive becomes higher, a thin film magnetic head has been required to further improve its performance. One example of the thin film magnetic head is a composite type thin film magnetic head, which is widely used. The composite type thin film magnetic head has a structure in which a magnetic detecting element, such as a magnetoresistive (MR) effect element, and a magnetic recording element, such as an electromagnetic coil element, are stacked. The magnetic detecting element and the magnetic recording element are used to read and write data signals from and onto a magnetic disk that is a magnetic recording medium.

In general, the magnetic recording medium is a discontinuous body of fine magnetic particles aggregated, and each of the fine magnetic particles is made in a single magnetic domain structure. A recording bit is composed of a plurality of fine magnetic particles. Therefore, in order to increase the recording density, it is necessary to decrease the size of the fine magnetic particles and thereby decrease unevenness at borders of recording bits. However, the decrease in the size of the fine magnetic particles raises the problem of degradation of thermostability of magnetization due to a reduction in volume.

A measure of the thermostability of magnetization is given by $K_u \cdot V/k_B \cdot T$. In this case, $K_u$ represents the magnetic anisotropy energy of the fine magnetic particles, V represents the volume of one magnetic particle, $k_B$ represents the Boltzmann constant, and T represents absolute temperature. The decrease in the volume V of fine magnetic particles leads to decrease of $K_u \cdot V/k_B \cdot T$ and to degradation of the thermostability. A conceivable countermeasure to this problem is to increase the magnetic anisotropy energy $K_u$ at the same time, but this increase of $K_u$ will lead to increase in the coercive force of the recording medium. In contrast to it, the intensity of the writing magnetic field by the magnetic head is virtually determined by the saturation magnetic flux density of a soft magnetic material making the magnetic poles in the head. Therefore, the writing becomes infeasible if the coercive force exceeds a tolerance determined from this limit of writing magnetic field intensity.

As a method of solving this problem of thermostability of magnetization, a so-called thermally assisted magnetic recording method has been proposed in which, while a magnetic material with large magnetic anisotropy energy $K_u$ is used, heat is applied to the recording medium immediately before application of the writing magnetic field, to decrease the coercive force, and writing is performed in that state. This method is generally classified into a magnetic dominant recording method and an optical dominant recording method. In the magnetic dominant recording method, the dominant of writing is an electromagnetic coil element and the radiation diameter of light is larger than the track width (recording width). On the other hand, in the optical dominant recording method, the dominant of writing is a light radiating portion and the radiation diameter of light is approximately equal to the track width (recording width). In other words, the magnetic field determines the spatial resolution in the magnetic dominant recording method, whereas the light determines the spatial resolution in the optical dominant recording method.

The structure of the thermally assisted magnetic head recording apparatus of this type is disclosed in which a light source, such as a semiconductor laser, is located at a position apart from a slider with a magnetic recording element for generating a magnetic field and in which light from this light source is guided through an optical fiber, a lens, etc., to a medium-facing surface of the slider in patent documents (International Publication No. WO92/02931 Pamphlet (Japanese Translation of International Application No. H06-500194), International Publication No. WO98/09284 Pamphlet, (Japanese Translation of International Application No. 2002-511176), Japanese Published Unexamined Patent Application No. H10-162444, International Publication No. WO99/53482 Pamphlet (Translation of International Application No. 2002-512725)) and a non-patent document (Shintaro Miyanishi et al., "Near-field Assisted Magnetic Recording" IEEE TRANSACTIONS ON MAGNETICS, 2005, Vol. 41, No. 10, pp. 2817-2821).

Additionally, the thermally assisted magnetic head is disclosed in which the magnetic recording element and the light source are integrated on a side surface of the slider, and the thermally assisted magnetic head is disclosed in which the magnetic recording element and the light source are integrated on the medium-facing surface of the slider in patent documents (Japanese Published Unexamined Patent Application No. 2001-283404, Japanese Published Unexamined Patent Application No. 2001-325756, Japanese Published Unexamined Patent Application No. 2004-158067, Japanese Published Unexamined Patent Application No. 2004-303299) and a non-patent document (Keiji Shono and Mitsumasa Oshiki "Status and Problems of Thermally Assisted Magnetic Recording" Journal of the Magnetics Society of Japan, 2005, Vol. 29, No. 1, pp. 5-132).

SUMMARY OF THE INVENTION

The optical fiber, lens, mirror, etc., must be used over a long distance for guiding light if the light source is located at the place far from the slider. This causes a problem of large reduction in propagation efficiency of light and a problem of complicated structure of the entire apparatus.

When the light source, in addition to the magnetic recording element, is integrated on the side surface of the slider, the yield of the thermally assisted magnetic head is likely to largely decrease by virtue of synergetic effect of the yield of the magnetic recording element and the yield of the light source.

For example, in the case of a semiconductor laser diode chip as an example of the light source, such characteristics as the output, the spread angle of laser light, and the lifetime largely vary according to stress on the chip. Therefore, it is necessary to perform characteristic tests of the chip after the chip is mounted on a substrate or the like. As a result, the yield of the magnetic head portion and the yield of the semiconductor laser diode part both cumulatively affect the production yield of the entire head, so as to heavily degrade the yield of the entire head.

Additionally, when the magnetic recording element and the light source are integrated on the medium-facing surface of the slider, the yield problem similar to that described above also arises. Furthermore, in this method, the magnetic recording element and the magnetic detecting element are formed on the medium-facing surface different from the side surface of the slider on which the magnetic recording element and the magnetic detecting element have been conventionally formed. Therefore, it is difficult to apply the production methods of the conventional magnetic detecting elements, such as the CPP-GMR effect element (Current Perpendicular to Plane-Giant Magneto Resistance effect element), and the magnetic recording elements with the electromagnetic coil for perpendicular magnetic recording. Therefore, it is very difficult to produce the thermally assisted magnetic head with sufficient performance.

Accordingly, a thermally assisted magnetic head has already been developed in which a waveguide is formed on the side surface of the slider together with the magnetic recording element, and a semiconductor laser diode is disposed near the slider so as to introduce output light of the semiconductor laser diode into the waveguide. The semiconductor laser diode is attached to the slider in a state in which a light-emission end surface of the semiconductor laser diode faces a light-incidence end surface of the waveguide.

However, the optical output of the semiconductor laser device for use in this thermally assisted magnetic head is not so large, and therefore the recording medium cannot be sufficiently heated without heightening the connection efficiency between the semiconductor laser diode and the waveguide. Accordingly, the semiconductor laser diode and the waveguide are required to be positioned with high accuracy so that the incident angle of light onto the light-incidence end surface of the waveguide becomes 0°. Therefore, disadvantageously, much time is consumed to assemble the thermally assisted magnetic head, and productive efficiency is inadequate.

An object of the present invention is to provide a thermally assisted magnetic head that has no need to position a waveguide and a semiconductor laser device with high accuracy.

The thermally assisted magnetic head of the present invention includes a slider that has a magnetic head portion facing a recording medium, a semiconductor laser device that oscillates in a TM mode and that generates light for heating the recording medium, a magnetic recording element that is disposed at the magnetic head portion and that generates a magnetic field for magnetic recording, and a waveguide that is disposed at the magnetic head portion, that has a light-incidence end surface facing a light-emission end surface of the semiconductor laser device, and that guides light from the semiconductor laser device to a surface of the recording medium.

The semiconductor laser device includes a p-type cladding layer and an n-type cladding layer, a p-side guide layer and an n-side guide layer placed between the p-type cladding layer and the n-type cladding layer, and an active layer that is placed between the p-side guide layer and the n-side guide layer and that includes at least one quantum well layer. The p-type cladding layer and the n-type cladding layer are each formed of a $(Al_{x1}Ga_{(1-x1)})_{0.51}In_{0.49}P$ layer ($0 \leq x1 \leq 1$). The p-side guide layer and the n-side guide layer are each formed of a $Al_{x2}Ga_{(1-x2)}As$ layer ($0 \leq x2 \leq 1$), and the quantum well layer is formed of an $Al_yGa_{(1-y)}As_{(1-x3)}P_{x3}$ layer ($0 \leq x3 \leq 1$, $0 \leq y \leq 0.3$). The $Al_yGa_{(1-y)}As_{(1-x3)}P_{x3}$ layer has a composition in which the ratio $x3/(1-x3)$ of the composition $x3$ of P to the composition $(1-x3)$ of As satisfies 1/4 or less.

Light emitted from the light-emission end surface of the semiconductor laser device is introduced from the light-incidence end surface into the waveguide, then passes through the waveguide, and is projected onto the surface of the recording medium. As a result, the surface of the recording medium is heated.

Since this semiconductor laser device oscillates in a TM (Transverse Magnetic) mode, the output light of the semiconductor laser device becomes a TM wave in which the electric field vector is parallel to the light propagation direction. In the TM wave, reflectance is gradually reduced as the absolute value of an incident angle onto a light incidence surface rises from 0°, and reaches zero when the absolute value reaches a predetermined value. The incident angle whose reflectance reaches zero is called "Brewster angle." The reflectance increases as the absolute value of the incident angle increases when the absolute value of the incident angle ranges from a value corresponding to the "Brewster angle" to 90°. The reflectance reaches the maximum when the absolute value of the incident angle is 90°.

Since the semiconductor laser device oscillates in the TM mode in the above-mentioned configuration, the output light of the semiconductor laser device becomes a TM wave. Therefore, the reflectance of the light-incidence end surface is reduced even if the incident angle of light onto the light-incidence end surface of the waveguide slightly deviates from 0°, and therefore the connection efficiency between the semiconductor laser device and the waveguide is not lowered. As a result, it is no longer necessary to position the waveguide and the semiconductor laser device with high accuracy. Therefore, the productive efficiency of the thermally assisted magnetic head can be improved without sacrificing the connection efficiency between the semiconductor laser device and the waveguide.

In a semiconductor laser device in which a quantum well layer is made of an arsenic-based compound semiconductor, such as an $Al_yGa_{(1-y)}As_{(1-x3)}P_{x3}$ layer, there is a fear that a difference between the refractive index of the quantum well layer and the refractive index of the guide layer will become excessively great if the guide layer is made of, for example, InGaAlP that is a phosphorus-based compound semiconductor. If so, the optical confinement effect will become excessively great, and hence the optical density at the end surface portion of the laser resonator will become high. As a result, catastrophic optical damage (COD) is liable to occur.

The "catastrophic optical damage" denotes a phenomenon in which the end surface of the laser resonator is destroyed by its own optical output when injection current is being increased to operate the semiconductor laser at high power. The catastrophic optical damage is a factor that limits a high output capability.

The optical damage of the end surface is caused as follows. Many interface states exist in the end surface (cleavage surface) of the semiconductor laser. When an electron and an electron hole are non-radiatively recombined with each other via the interface state, energy discharged in response to this recombination is converted into heat. In the semiconductor, its energy gap is narrowed with increasing temperature, and therefore the energy gap of the end surface warmed by discharged heat is narrowed. Since the energy gap of the end surface is narrow, induced emission light generated by a recombination of an electron and an electron hole inside the semiconductor laser is absorbed there and is again converted into heat, and the energy gap of the end surface is further narrowed. This repetition causes a rapid temperature rise in the end surface, and causes melting, and, as a result, oscillation is stopped.

In the configuration of the present invention, the quantum well layer is formed of an $Al_yGa_{(1-y)}As_{(1-x3)}P_{x3}$ layer that is an arsenic-based compound semiconductor, and the p-side guide layer and the n-side guide layer are each formed of an $Al_{x2}Ga_{(1-x2)}As$ layer ($0 \leq x2 \leq 1$) that is an arsenic-based compound semiconductor. Therefore, a difference in the refractive index between the guide layer and the quantum well layer can be made smaller than in a case in which the guide layer is made of InGaAlP that is a phosphorus-based compound semiconductor. As a result, the optical confinement effect can be prevented from being excessively heightened, and an optical density at the end surface portion of the laser resonator can be lowered. Accordingly, catastrophic optical damage can be restrained, and a high output capability can be achieved. As a result, the output of light guided to the waveguide can be kept at more than a constant value even if the connection efficiency between the waveguide and the semiconductor laser device is somewhat inadequate. Therefore, the waveguide and the semiconductor laser device are not required to be positioned with high accuracy. Accordingly, the productive efficiency of the thermally assisted magnetic head can be improved.

Additionally, the $Al_{x2}Ga_{(1-x2)}As$ ($0 \leq x2 \leq 1$) layer that forms the n-side and p-side guide layers has a wide span of adjustable range of the band gap, and therefore an emission beam can be easily designed. For example, a light beam whose aspect ratio in the cross section is approximately 1 can be output, i.e., a light beam whose cross section assumes substantially a circular shape can be output.

Additionally, in the above-mentioned configuration, the quantum well layer is formed of an $Al_yGa_{(1-y)}As_{(1-x3)}P_{x3}$ layer ($0 \leq x3 \leq 1$, $0 \leq y \leq 0.3$). $Al_yGa_{(1-y)}As_{(1-x3)}P_{x3}$ is smaller in the band gap than other materials, such as InGaP, used as the quantum well layer. Therefore, it is possible to enlarge a band gap difference between the cladding layer and the active layer. This makes it possible to realize a thermally assisted magnetic head provided with a semiconductor laser device that is excellent in temperature characteristics, i.e., to realize a thermally assisted magnetic head provided with a semiconductor laser device that is small in the variation of threshold current or working current when the temperature changes.

Additionally, in the configuration of the present invention, the $Al_yGa_{(1-y)}As_{(1-x3)}P_{x3}$ layer has a composition in which the ratio $x3/(1-x3)$ of the composition $x3$ of P to the composition $(1-x3)$ of As satisfies 1/4 or less. The reason is that there is a fear that an increase of the P composition will cause an increase of tensile distortion caused in the quantum well layer and will cause cracks or leakage current if the ratio $x3/(1-x3)$ of the composition $x3$ of P to the composition $(1-x3)$ of As is greater than 1/4.

In a semiconductor laser device in which a quantum well layer is formed of an AlGaAsP layer, a cladding layer is generally formed of an AlGaAs layer. In the configuration of the present invention, the quantum well layer is formed of an $Al_yGa_{(1-y)}As_{(1-x3)}P_{x3}$ layer, whereas the cladding layer is formed of a $(Al_{x1}Ga_{(1-x1)})_{0.51}In_{0.49}P$ layer. Therefore, a difference in the band gap between the cladding layer and the active layer can be enlarged, and therefore temperature characteristics of the semiconductor laser device can be improved. Additionally, since zinc can be easily diffused as described below in detail, it becomes easy to produce an end-surface window structure in the semiconductor laser device.

In order to restrain catastrophic optical damage (COD), it is conceivable to produce an end-surface window structure that widens a band gap of an active layer by diffusing an impurity, such as zinc, into the end surface portion of the laser resonator. When an impurity, such as zinc, is diffused to produce such an end-surface window structure, diffusion velocity will be increased if a region into which the impurity is diffused contains phosphorus.

As described above, in the configuration of the present invention, the p-type cladding layer and the n-type cladding layer are each formed of a $(Al_{x1}Ga_{(1-x1)})_{0.51}In_{0.49}P$ layer that contains phosphorus. Therefore, an impurity, such as zinc, is easily diffused, and therefore the end-surface window structure can be easily produced. Accordingly, it is possible to realize a thermally assisted magnetic head provided with a semiconductor laser device suitable for a high output capability. Additionally, the ratio of the composition of In to the composition of $(Al_{x1}Ga_{(1-x1)})$ is set at 0.49/0.51, and therefore the p-type cladding layer and the n-type cladding layer make a lattice match with a GaAs substrate, and high-quality crystals can be obtained. As a result, it is possible to obtain a thermally assisted magnetic head including a semiconductor laser device with high reliability.

The semiconductor laser device is characterized in that the $Al_{x2}Ga_{(1-x2)}As$ layer preferably has a composition that satisfies $x2 \geq 0.4$. The reason is that, if $x2$ is smaller than 0.4, the band gap of the active layer at the end surface portion cannot be sufficiently widened even if an end-surface window structure is formed at the end surface portion of the laser resonator.

This point will be described in more detail. When the end-surface window structure is produced at the end surface portion of the laser resonator, the band gap of the active layer at the end surface portion reaches a mean value between the band gap of the guide layer and the band gap of the quantum well layer. Therefore, in order to sufficiently widen the band gap of the active layer at the end surface portion by producing the end-surface window structure, the band gap of the guide layer is required to be greater than a predetermined value (specifically, 1.8 eV). On the other hand, the band gap of the $Al_{x2}Ga_{(1-x2)}As$ layer that forms the guide layer becomes greater as the composition $x2$ of Al increases. Accordingly, the band gap of the guide layer can be made greater than the predetermined value by setting the composition $x2$ of Al at 0.4 or more.

If limitations are imposed on the mounting space of the semiconductor laser device, the semiconductor laser device might be required to oscillate in the TM mode. Preferably, in that case, the semiconductor laser device, more specifically, the $Al_yGa_{(1-y)}As_{(1-x3)}P_{x3}$ layer has a composition in which the ratio $x3/(1-x3)$ of the composition $x3$ of P to the composition $(1-x3)$ of As satisfies from 1/9 to 1/4. This configuration causes a tensile distortion in the active layer, thereby making the ratio of light intensity of the TM (Transverse Magnetic) mode to light intensity of the TE (Transverse Electric) mode higher. A greater tensile distortion can be caused in the quantum well layer as the lattice constant of the quantum well layer decreases. The lattice constant of the $Al_yGa_{(1-y)}As_{(1-x3)}P_{x3}$ layer that forms the quantum well layer becomes smaller as the ratio of the composition of P to the composition of As increases.

The reason why the ratio of the composition of P to the composition of As is preferably 1/9 or more is that the tensile distortion caused in the quantum well layer is insufficient if this ratio is less than 1/9, and therefore it is difficult to make the ratio of the TM mode greater than that of the TE mode. On the other hand, the reason why the ratio of the composition of P to the composition of As is preferably 1/4 or less is that, as described above, there is a fear that an increase of the P composition will cause an increase of tensile distortion caused in the quantum well layer and will cause cracks or leakage current if this ratio is greater than 1/4.

When the semiconductor laser device is required to oscillate in the TE mode, it is recommended to reduce the composition of P of the $Al_yGa_{(1-y)}As_{(1-x3)}P_{x3}$ layer. Preferably, in that case, the composition of P is set at zero when produced.

Additionally, from the viewpoint of a lifetime, the quantum well layer had better not contain Al. In other words, from the viewpoint of a lifetime, $y$ is preferably equal to zero (i.e., $y=0$).

Additionally, the semiconductor laser device is characterized in that, preferably, the oscillation wavelength is from 770 nm to 830 nm, and the film thickness of the quantum well layer is from 9 nm to 14 nm. The reason is that, in order to oscillate the semiconductor laser device in the TM mode, it is recommended to thicken the active layer so as to reduce relative oscillation threshold current between the TE mode and the TM mode. When the composition (y) of Al of the quantum well layer is 0, the TM mode is used in an oscillation wavelength of 770 nm to 830 nm.

The reason why the oscillation wavelength of the semiconductor laser device is preferably 770 nm or greater is that the absorption of light in the waveguide will become larger if the oscillation wavelength is smaller than 770 nm. The reason why the oscillation wavelength of the semiconductor laser device is preferably 830 nm or smaller is that the light absorption by molecular vibrations will be caused, and the size of the waveguide will become larger if the oscillation wavelength is greater than 830 nm. Since much time is consumed to produce a large waveguide, productive efficiency worsens.

Additionally, the semiconductor laser device is characterized in that, preferably, an end-surface window structure that widens a band gap of the active layer is formed at an end surface portion of a laser resonator. When an end-surface window structure is formed at the end surface portion of the laser resonator, the band gap of the active layer can be widened in the end surface portion. Therefore, it becomes difficult for induced emission light generated by a recombination of electrons and electron holes inside to be absorbed at the end surface portion of the resonator, and therefore heat generation is restrained. This makes it possible to restrain the occurrence of catastrophic optical damage, and therefore a high output capability can be achieved.

Preferably, from the viewpoint of mass productivity, the end-surface window structure is formed by selectively diffusing, for example, Zn into the end surface portion of the laser resonator. The end-surface window structure may be formed, for example, by employing a method of embedding another material (for example, the same material as the cladding layer) in the end surface portion of the laser resonator or a method of thinning the active layer only at the end surface portion.

In the embodiment of the present invention, the waveguide and the semiconductor laser device are disposed so that the thickness direction of the semiconductor laser device coincides with the thickness direction of the waveguide, and the cross-sectional shape of a light beam in the light-emission end surface of the semiconductor laser device is an elliptical shape in which the thickness direction of the semiconductor laser device is a minor axis direction. Since the output light of the semiconductor laser device is a TM wave, the output light of the semiconductor laser device becomes light polarized in the minor axis direction of the cross-sectional shape of the light beam. Therefore, light polarized in the thickness direction of the waveguide can be efficiently introduced into the waveguide even if the thickness of the waveguide is small.

Preferably, a distance between the light-emission end surface of the semiconductor laser device and the light-incidence end surface of the waveguide is 5 μm or less. If the distance between the light-emission end surface of the semiconductor laser device and the light-incidence end surface of the waveguide is 5 μm or less, the distance therebetween is short, and therefore the shape of a light beam that impinges on the light-incidence end surface of the waveguide assumes an elliptical shape in which the thickness direction of the semiconductor laser device is the minor axis direction in the same manner as the shape of a light beam emitted from the light-emission end surface of the semiconductor laser device.

The waveguide and the semiconductor laser device may be disposed so that the incident angle of the output light of the semiconductor laser device onto the light-incidence end surface of the waveguide becomes a Brewster angle. According to this configuration, the reflectance of the output light of the semiconductor laser device on the light-incidence end surface of the waveguide reaches zero, and therefore the connection efficiency between the semiconductor laser device and the waveguide can be improved.

The above-mentioned object, other objects, features, and effects of the present invention will be clarified by a description of the embodiment given below with reference to the accompanying drawings.

BRIEF DESCRIPTION OF THE DRAWINGS

FIG. 1 is a perspective view schematically showing a configuration of a hard disk drive provided with a thermally assisted magnetic head and a configuration of an HGA (Head Gimbal Assembly) according to an embodiment of the present invention.

FIG. 7 is a plan view for describing a configuration of a semiconductor laser diode.

FIG. 8 is a sectional view along line VIII-VIII of FIG. 7.

FIG. 11A is an energy band diagram showing a band gap in this embodiment, and FIG. 11B is an energy band diagram showing a band gap when the guide layer is made of InGaAlP.

FIG. 21 is a process drawing for describing a production method of a thermally assisted magnetic head.

DESCRIPTION OF THE PREFERRED EMBODIMENTS

Embodiments of the present invention will be hereinafter described in further detail with reference to the accompanying drawings.

Figure 2:
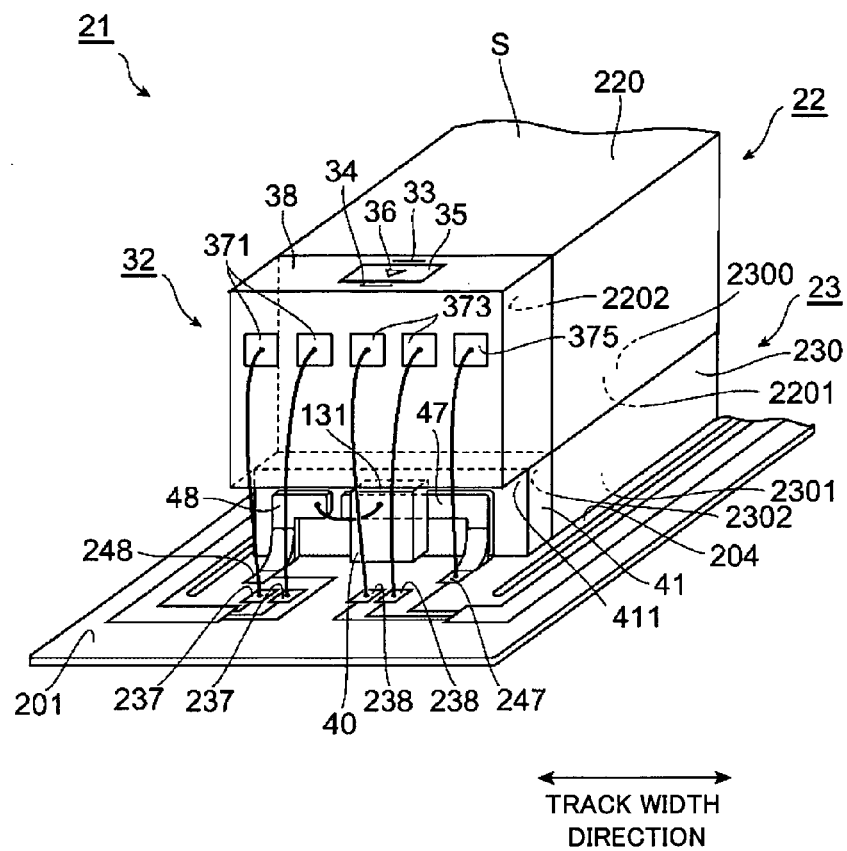
FIG. 2 is an enlarged perspective view of a distal end of the HGA.

FIG. 1 is a perspective view schematically showing a configuration ((a) of FIG. 1) of a hard disk drive provided with a thermally assisted magnetic head and a configuration ((b) of FIG. 1) of an HGA (Head Gimbal Assembly) according to an embodiment of the present invention. FIG. 2 is an enlarged perspective view of a part near the thermally assisted magnetic head 21 of FIG. 1. In the perspective view ((b) of FIG. 1) of the HGA, the side of the HGA facing a surface of a magnetic disk is illustrated up.

[Hard Disk Drive]

As shown in (a) of FIG. 1, the hard disk drive 1 has magnetic disks 10 consisting of a plurality of magnetic recording media to rotate around a rotation shaft of a spindle motor 11, an assembly carriage device 12 for positioning each thermally assisted magnetic head 21 on a track, and a recording, reproduction, and emission control circuit (controller) 13 for controlling writing and reading operations of each thermally assisted magnetic head 21 and for controlling a semiconductor laser diode that emits light for thermally assisted magnetic recording.

The assembly carriage device 12 is provided with a plurality of drive arms 14. These drive arms 14 are rockable around a pivot bearing shaft 16 by a voice coil motor (VCM) 15, and are stacked in the direction along this shaft 16. An HGA 17 is attached to the distal end of each drive arm 14. Each HGA 17 is provided with a thermally assisted magnetic head 21 so that it faces the surface of each magnetic disk 10. The surface of the thermally assisted magnetic head 21 facing the surface of the magnetic disk 10 is a medium-facing surface S (which is also called an air bearing surface) of the thermally assisted magnetic head 21. The number of magnetic disks 10, the number of drive arms 14, the number of HGAs 17, and the number of thermally assisted magnetic heads 21 may be one each.

[HGA]

As shown in (b) of FIG. 1, the HGA 17 is constructed by fixing the thermally assisted magnetic head 21 to a distal end of a suspension 20 and electrically connecting one end of a wiring member 203 to terminal electrodes of the thermally assisted magnetic head 21. The suspension 20 includes a load beam 200, a flexure 201 with elasticity fixed to this load beam 200, a tongue portion 204 formed in a plate spring shape at the tip of the flexure 201, a base plate 202 disposed on the base part of the load beam 200, and a wiring member 203 disposed on the flexure 201 and consisting of a lead conductor and connection pads electrically connected to both ends of the lead conductor.

As shown in FIG. 2, the wiring member 203 has a pair of electrode pads 237, 237 for recording signals, a pair of electrode pads 238, 238 for readout signals, and a pair of electrode pads 247, 248 for driving of the light source.

It is obvious that the structure of the suspension in the HGA 17 is not limited to the above-described structure. Additionally, an IC chip, not shown, for driving of the head may be mounted midway in the suspension 20.

[Thermally Assisted Magnetic Head]

Figure 3:
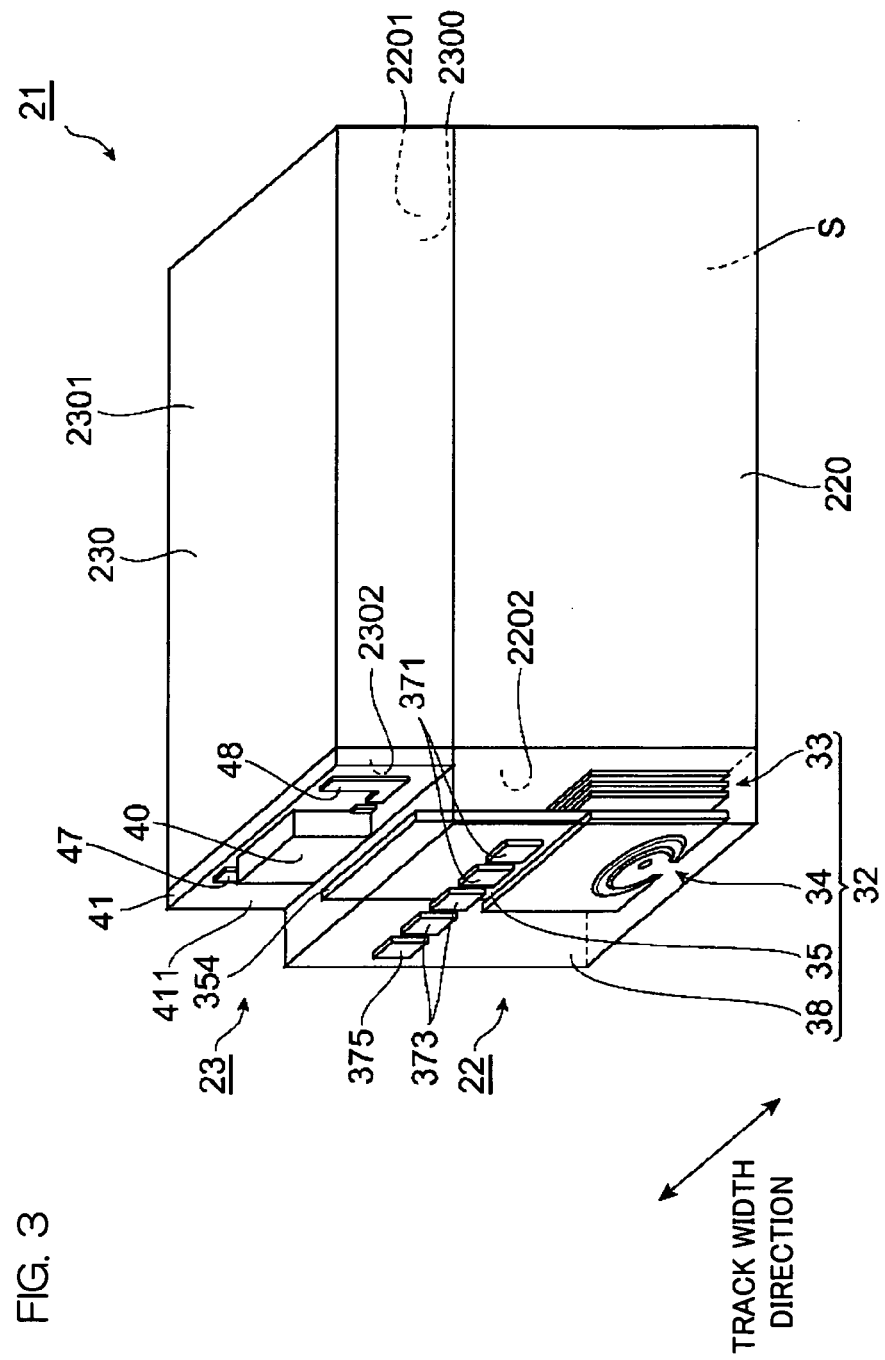
FIG. 3 is a perspective view schematically showing a configuration of a thermally assisted magnetic head.
Figure 4:
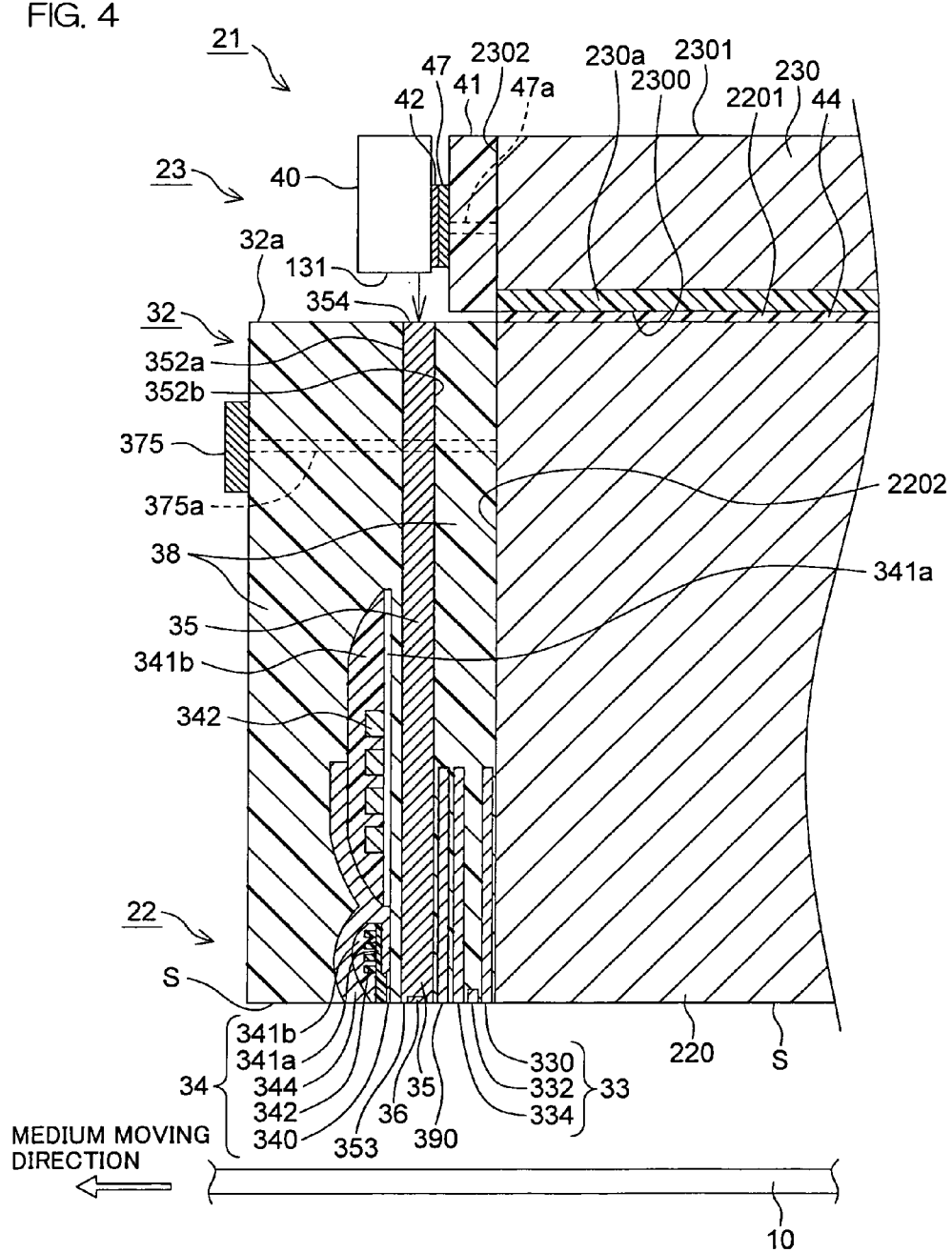
FIG. 4 is a sectional view perpendicular to a medium-facing surface of the thermally assisted magnetic head.

As shown in FIGS. 2 to 4, the thermally assisted magnetic head 21 has a slider 22 and a light source unit 23. The light source unit 23 has a semiconductor laser diode 40 that oscillates in a TM mode and that emits light to heat the magnetic disk 10 and a light source support substrate 230 that supports the semiconductor laser diode 40. A bond surface 2300 of the light source support substrate 230 is bonded to a back surface 2201 of the slider substrate 220. The back surface 2201 of the slider substrate 220 is a surface opposite to the medium-facing surface S of the slider 22. A bottom surface 2301 of the light source support substrate 230 is bonded to the tongue portion 204 of the flexure 201 with an adhesive such as epoxy resin.

[Slider]

The slider 22 has a slider substrate 220 and a magnetic head portion 32 for performing writing and reading of data signals. The slider substrate 220 is rectangular, and has the medium-facing surface S processed so as to achieve an appropriate levitation amount. The slider substrate 220 is made of electrically conductive AlTiC ($Al_2O_3$—TiC) or the like.

The magnetic head portion 32 is formed on an integration surface 2202 that is a side surface approximately perpendicular to the medium-facing surface S of the slider substrate 220. The magnetic head portion 32 has an MR effect element 33 as a magnetic detecting element for detecting magnetic information, an electromagnetic coil element 34 as a perpendicular (or, possibly, longitudinal) magnetic recording element for writing magnetic information by generation of a magnetic field, a waveguide 35 provided through between the MR effect element 33 and the electromagnetic coil element 34, a near-field light generator 36 for generating near-field light for heating a recording layer portion of a magnetic disk, an insulating layer 38 formed on the integration surface 2202 so as to cover these components, and a plurality of electrode pads exposed from the layer surface of the insulating layer 38. The electrode pads include a pair of electrode pads 371, 371 for signal terminals connected to the MR effect element 33, a pair of electrode pads 373, 373 for signal terminals connected to the electromagnetic coil element 34, and an electrode pad 375 for ground electrically connected to the slider substrate 220. The end surfaces of the MR effect element 33, electromagnetic coil element 34, and near-field light generator 36 are exposed in the medium-facing surface S. In other words, these end surfaces face the recording medium 10.

FIG. 4 is a sectional view of the part near the magnetic head portion of the thermally assisted magnetic head 21. The MR effect element 33 includes an MR laminate 332, and a lower shield layer 330 and an upper shield layer 334 located at respective positions on both sides of this MR laminate 332. The lower shield layer 330 and the upper shield layer 334 can be made, for example, of a magnetic material of NiFe, CoFeNi, CoFe, FeN, FeZrN, or the like and in the thickness of about 0.5 to 3 μm by, for example, a pattern plating method including a frame plating method, or the like. The upper and lower shield layers 334 and 330 prevent the MR laminate 332 from being affected by an external magnetic field as noise.

The MR laminate 332 includes a magneto-resistance effect film, and is sensitive to a signal magnetic field from the magnetic disk with very high sensitivity. A current-in-plane type (CIP) giant magneto resistance (GMR) multilayer film, a current-perpendicular-to-plane type (CPP) GMR multilayer film, or a tunnel magneto resistance (TMR) multilayer film can be mentioned as the magneto-resistance effect film.

For example, when the MR laminate 332 includes a TMR multilayer film, it has a structure in which an antiferromagnetic layer, a magnetization fixed layer, a tunnel barrier layer, and a magnetization free layer are stacked in order. The antiferromagnetic layer is made of IrMn, PtMn, NiMn, RuRhMn, or the like and has a thickness of about 5 to 15 nm. The magnetization fixed layer is comprised, for example, of CoFe or the like as a ferromagnetic material, or two layers of CoFe or the like with a nonmagnetic metal layer of Ru or the like in between, and has the magnetization direction fixed by the antiferromagnetic layer. The tunnel barrier layer of a nonmagnetic dielectric material is made, for example, by oxidizing a metal film of Al, AlCu, or the like about 0.5 to 1 nm thick by oxygen introduced into a vacuum chamber, or by natural oxidation. The magnetization free layer is comprised, for example, of two layered films of CoFe or the like about 1 nm thick and NiFe or the like about 3 to 4 nm thick as a ferromagnetic material, and effects tunnel exchange coupling through the tunnel barrier layer with the magnetization fixed layer.

An interelement shield layer 390 made of the same material as the lower shield layer 330 is formed between the MR effect element 33 and the waveguide 35. The interelement shield layer 390 shields the MR effect element 33 from a magnetic field generated by the electromagnetic coil element 34 and prevents external noise during readout. A bucking coil portion may also be further formed between the interelement shield layer 390 and the waveguide 35. The bucking coil portion generates a magnetic flux to cancel a magnetic flux loop generated by the electromagnetic coil element 34 and passing via the upper and lower electrode layers of the MR effect element 33, and thereby suppresses the Wide Area Track Erasure (WATE) phenomenon being an unwanted writing or erasing operation on the magnetic disk.

The insulating layer 38 made of alumina or the like is formed between the shield layers 330, 334 on the opposite side to the medium-facing surface S of the MR laminate 332. This insulating layer 38 extends on the opposite side to the medium-facing surface S of the shield layers 330, 334, 390, between the lower shield layer 330 and the slider substrate 220, and between the interelement shield layer 390 and the waveguide 35.

When the MR laminate 332 includes a CIP-GMR multilayer film, upper and lower shield gap layers for insulation of alumina or the like are provided between each of the upper and lower shield layers 334 and 330, and the MR laminate 332. Furthermore, an MR lead conductor layer for supplying a sense current to the MR laminate 332 to extract reproduction output is formed although not shown. On the other hand, when the MR laminate 332 includes a CPP-GMR multilayer film or a TMR multilayer film, the upper and lower shield layers 334 and 330 also function as upper and lower electrode layers, respectively. In this case, the upper and lower shield gap layers and MR lead conductor layer are unnecessary and omitted.

A hard bias layer for applying a vertical bias magnetic field for stabilization of magnetic domains is formed on both sides in the track width direction of the MR laminate 332, although not shown. The hard bias layer is made of a ferromagnetic material such as CoTa, CoCrPt, or CoPt.

The electromagnetic coil element 34 is preferably one for perpendicular magnetic recording and, as shown in FIG. 4, has a main magnetic pole layer 340, a gap layer 341a, a coil insulating layer 341b, a coil layer 342, and an auxiliary magnetic pole layer 344.

Figure 5:
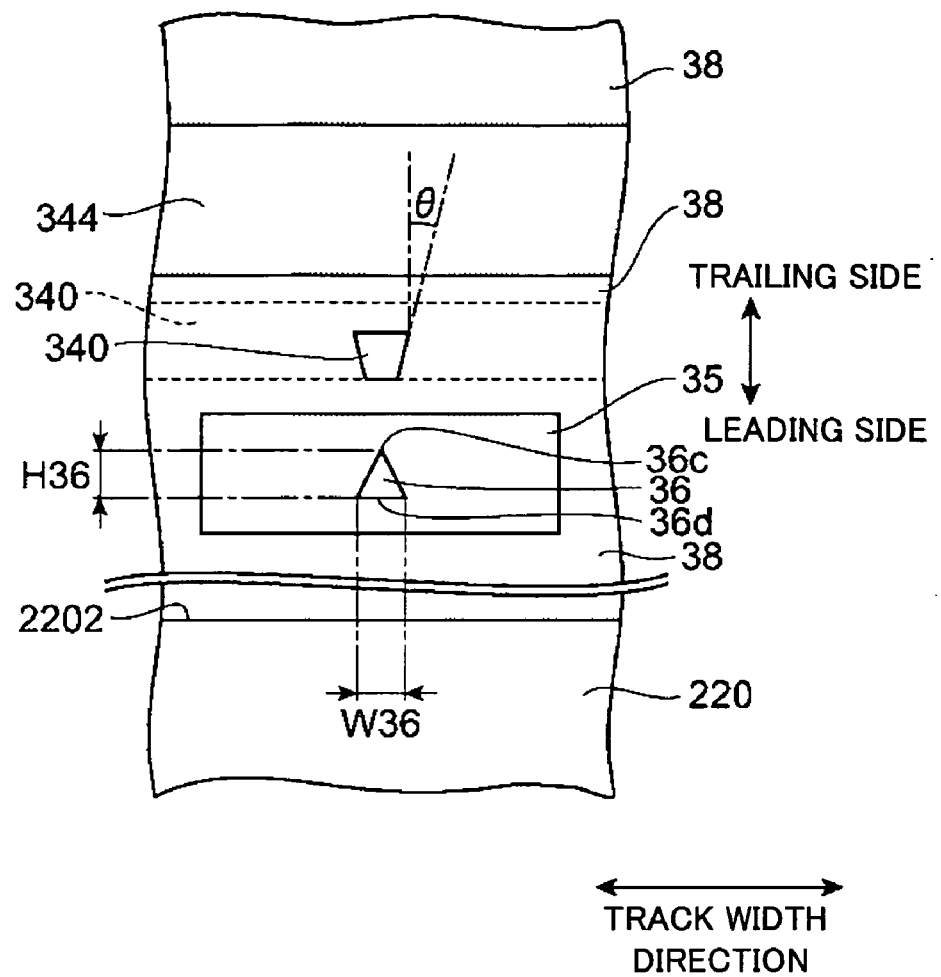
FIG. 5 is a schematic view from the medium-facing surface of the thermally assisted magnetic head.

The main magnetic pole layer 340 is a magnetic guide for guiding a magnetic flux induced by the coil layer 342, up to the recording layer of the magnetic disk (medium) as a target of writing, while converging the magnetic flux. The end of the main magnetic pole layer 340 on the medium-facing surface S side preferably has a width in the track width direction (depth direction in FIG. 4) and a thickness in the stack direction (horizontal direction in FIG. 4) smaller than those of the other portions. This results in permitting the main magnetic pole layer to generate a fine and strong writing magnetic field adapted for high recording density. Specifically, for example, as shown in FIG. 5 which is a view of the magnetic head portion 32 from the medium-facing surface S side, the tip of the main magnetic pole layer 340 on the medium-facing surface S side is preferably tapered in a shape of an inverted trapezoid whose length of the side on the leading side or slider substrate 220 side is shorter than the length of the side on the trailing side. In other words, the end surface of the main magnetic pole layer 340 on the medium-facing surface S side is provided with a bevel angle θ in order to avoid unwanted writing or the like on an adjacent track by influence of a skew angle made by actuation with a rotary actuator. The magnitude of the bevel angle θ is, for example, approximately 15°. In practice, the writing magnetic field is generated mainly near the longer side on the trailing side and in the case of the magnetic dominant recording, the length of this longer side determines the width of the writing track.

The main magnetic pole layer 340 is preferably made, for example, in the total thickness of about 0.01 to about 0.5 μm at the end portion on the medium-facing surface S side and in the total thickness of about 0.5 to about 3.0 μm at the portions other than this end portion. More specifically, the main magnetic pole layer 340 is preferably made, for example, of an alloy of two or three out of Ni, Fe, and Co by frame plating, sputtering, or the like, or an alloy containing the foregoing elements as main ingredients and doped with a predetermined element. The track width can be, for example, 100 nm.

As shown in FIG. 4, the end portion of the auxiliary magnetic pole layer 344 on the medium-facing surface S side forms a trailing shield portion wider in a layer section than the other portion of the auxiliary magnetic pole layer 344. The auxiliary magnetic pole layer 344 is opposed to the end of the main magnetic pole layer 340 on the medium-facing surface S side through the gap layer 341a and coil insulating layer 341b made of an insulating material such as alumina. When the auxiliary magnetic pole layer 344 of this configuration is provided, the magnetic field gradient becomes steeper between the auxiliary magnetic pole layer 344 and the main magnetic pole layer 340 near the medium-facing surface S. This results in decreasing jitter of signal output and hence permitting decrease in the error rate during readout.

The auxiliary magnetic pole layer 344 is made, for example, in the thickness of about 0.5 to about 5 μm. The auxiliary magnetic pole layer 344 is made, for example, of an alloy of two or three out of Ni, Fe, and Co by frame plating, sputtering, or the like, or an alloy containing these as principal ingredients and doped with a predetermined element.

The gap layer 341a separates the coil layer 342 from the main magnetic pole layer 340 and has a thickness of, for example, about 0.01 to about 0.5 μm. The gap layer 341a is made, for example, of $Al_2O_3$ or DLC or the like by sputtering, CVD, or the like.

The coil layer 342 is made, for example, in the thickness of about 0.5 to about 3 μm and, for example, of Cu or the like by frame plating or the like. The rear end of the main magnetic pole layer 340 is coupled with the portion of the auxiliary magnetic pole layer 344 apart from the medium-facing surface S, and the coil layer 342 is formed so as to surround this coupling portion.

The coil insulating layer 341b separates the coil layer 342 from the auxiliary magnetic pole layer 344 and is made, for example, in the thickness of about 0.1 to about 5 μm and of an electric insulating material such as thermally cured alumina or resist layer or the like.

Figure 6:
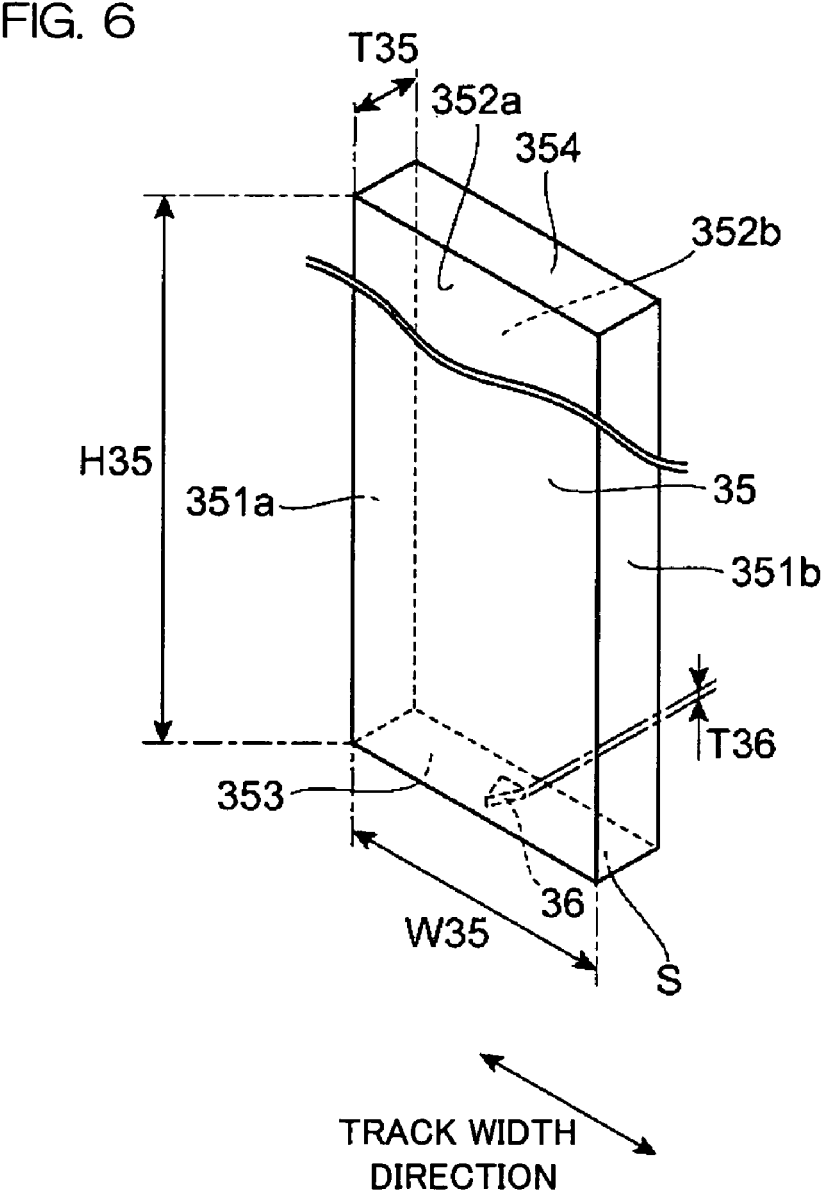
FIG. 6 is a perspective view showing a waveguide and a near-field light generator of the thermally assisted magnetic head.

The waveguide 35 is located between the MR effect element 33 and the electromagnetic coil element 34, and extends in parallel with the integration surface 2202. The waveguide 35 extends from the medium-facing surface S of the magnetic head portion 32 to the surface 32a opposite to the medium-facing surface S of the magnetic head portion 32, and is of a rectangular plate shape, as shown in FIG. 6. The waveguide 35 has two side surfaces 351a, 351b opposed in the track width direction, and an upper surface 352a and a lower surface 352b parallel to the integration surface 2202, all of which are formed perpendicularly to the medium-facing surface S. The waveguide 35 also has a light-emission end surface 353 forming the medium-facing surface S, and a light-incidence end surface 354 opposite to the light-emission end surface 353. The upper surface 352a, the lower surface 352b, and the two side surfaces 351a, 351b of the waveguide 35 are in contact with the insulating layer 38. The insulating layer 38 has the refractive index smaller than that of the waveguide 35, and functions as a cladding for the waveguide 35.

The distance between the upper surface 352a and the lower surface 352b is the thickness of the waveguide 35. The thickness direction of the waveguide 35 denotes a direction parallel to a direction in which materials are stacked when the waveguide 35 is formed (manufactured), and is a direction perpendicular to the upper and lower surfaces 352a and 352b.

This waveguide 35 is capable of guiding light incident through the light-incidence end surface 354, to the light-emission end surface 353 as the end surface on the medium-facing surface S side, while reflecting the light on the two side surfaces 351a, 351b, the upper surface 352a, and the lower surface 352b. The width W35 of the waveguide 35 in the track width direction in FIG. 6 can be, for example, 1 to 200 μm, the thickness T35 can be, for example, 2 to 10 μm, and the height H35 can be 10 to 300 μm.

The waveguide 35 is made, for example, by sputtering or the like, from a dielectric material that has the refractive index n higher than that of the material making the insulating layer 38, everywhere. For example, in a case where the insulating layer 38 is made of $SiO_2$ (n=1.5), the waveguide 35 may be made of $Al_2O_3$ (n=1.63). Furthermore, in a case where the insulating layer 38 is made of $Al_2O_3$ (n=1.63), the waveguide 35 may be made of $Ta_2O_5$ (n=2.16), $Nb_2O_5$ (n=2.33), TiO (n=2.3 to 2.55), or $TiO_2$ (n=2.3 to 2.55). When the waveguide 35 is made of one of such materials, the total reflection condition is met at the interface, in addition to the good optical characteristics of the material itself, so as to decrease the propagation loss of laser light and increase the efficiency of generation of near-field light.

The near-field light generator 36, as shown in FIGS. 2, 4, 5, and 6, is a platelike member disposed approximately in the center of the light-emission end surface 353 of the waveguide 35. As shown in FIGS. 4 and 6, the near-field light generator 36 is buried in the light-emission end surface 353 of the waveguide 35 so that the end surface thereof is exposed in the medium-facing surface S. As shown in FIG. 5, the near-field light generator 36 is of a triangular shape when viewed from the medium-facing surface S, and is made of an electroconductive material. The base 36d of the triangle is arranged in parallel with the integration surface 2202 of the slider substrate 220, i.e., in parallel with the track width direction. The vertex 36c facing the base 36d is arranged on the main magnetic pole layer 340 side of the electromagnetic coil element 34 with respect to the base 36d. Specifically, the vertex 36c is arranged opposite to the leading edge of the main magnetic pole layer 340. A preferred form of the near-field light generator 36 is an isosceles triangle whose two base angles at the two ends of the base 36d are equal to each other when viewed from the medium-facing surface S.

The near-field light generator 36 is preferably made of Au, Ag, Al, Cu, Pd, Pt, Rh, or Ir, or an alloy as a combination of two or more selected from the foregoing elements.

In FIG. 5, the radius of curvature of the vertex 36c is preferably 5 to 100 nm. The height H36 of the triangle is preferably sufficiently smaller than the wavelength of incident laser light and preferably 20 to 400 nm. The width W36 of the base 36d is preferably sufficiently smaller than the wavelength of incident laser light and preferably 20 to 400 nm. The thickness T36 of the near-field light generator 36 in FIG. 6 is preferably 10 to 100 nm.

When the near-field light generator 36 is disposed on the light-emission end surface 353 of the waveguide 35, the electric field is concentrated near the vertex 36c of the near-field light generator 36, and the near-field light is generated from near the vertex 36c toward the medium.

As shown in FIG. 2, the electrode pads 371, 371 are electrically connected through bonding wires to the respective electrode pads 237, 237 of the flexure 201, and the electrode pads 373, 373 are connected through bonding wires to the respective electrode pads 238, 238 of the flexure 201. This configuration allows each of the electromagnetic coil element and the MR effect element to be driven. The electrode pad 375 electrically connected through a via hole 375a in FIG. 4 to the slider substrate 220 is connected through a bonding wire to the electrode pad 247 of the flexure 201, as shown in FIG. 2. As a result, a potential of the slider substrate 220 can be controlled, for example, to the ground potential by the electrode pad 247.

[Light Source Unit]

The components of the light source unit 23 in the thermally assisted magnetic head 21 will be described below. As shown in FIGS. 2 to 4, the light source unit 23 includes the light source support substrate 230 and a semiconductor laser diode (light source) 40.

The light source support substrate 230 is a substrate of AlTiC ($Al_2O_3$—TiC) or the like and has the bond surface 2300 bonded to the back surface 2201 of the slider substrate 220. As shown in FIG. 4, a heat insulation layer 230a of alumina or the like is formed on the bond surface 2300. An insulating layer 41 of an insulating material, such as alumina, is disposed on an element forming surface 2302 being one side surface when the bond surface 2300 is regarded as a bottom surface. The electrode pads 47, 48 are formed on this insulating layer 41 (see FIG. 2). The laser diode 40 is fixed onto the electrode pad 47 which is one of the two electrode pads.

More specifically, as shown in FIGS. 2 and 3, the electrode pads 47, 48 are formed for driving of laser, on a surface 411 of the insulating layer 41. The surface 411 is a surface that intersects with the medium-facing surface S and, in other words, is a surface parallel to the integration surface 2202 of the slider substrate 220. The electrode pad 47, as shown in FIG. 4, is electrically connected through a via hole 47a provided in the insulating layer 41, to the light source support substrate 230. The electrode pad 47 also functions as a heat sink for leading heat generated during driving of the semiconductor laser diode 40 through the via hole 47a to the light source support substrate 230 side.

The electrode pad 47, as shown in FIG. 2, is formed so as to extend in the track width direction in the central region of the surface 411 of the insulating layer 41. On the other hand, the electrode pad 48 is formed at a position separate in the track width direction from the electrode pad 47. Each of the electrode pads 47, 48 further extends toward the flexure 201 side, for connection with the flexure 201 by solder reflow.

The electrode pads 47, 48 are electrically connected to the electrode pads 247, 248 of the flexure 201, respectively, by reflow soldering, whereby the semiconductor laser diode 40 can be driven. Since the electrode pad 47 is electrically connected to the light source support substrate 230 as described above, the potential of the light source support substrate 230 can be controlled, for example, to the ground potential by the electrode pad 247.

The electrode pads 47, 48 can be comprised, for example, of layers of Au, Cu, or the like made in the thickness of about 1 to 3 μm and by vacuum evaporation, sputtering, or the like, which are formed, for example, through a ground layer of Ta, Ti, or the like about 10 nm thick. The semiconductor laser diode 40 is electrically connected to the electrode pad 47 by a solder layer 42 (see FIG. 4) of an electrically conductive solder material such as Au—Sn.

Figure 9:
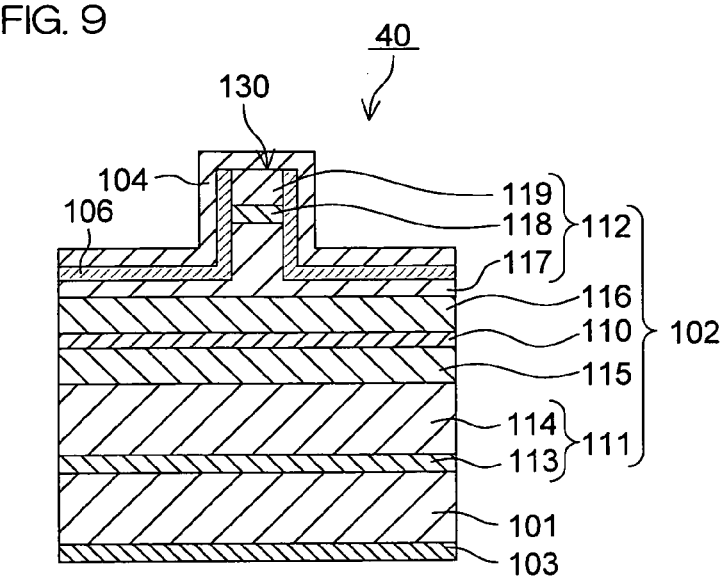
FIG. 9 is a sectional view along line IX-IX of FIG. 7.

FIG. 7 is a plan view for describing a configuration of the semiconductor laser diode 40, FIG. 8 is a sectional view along line VIII-VIII of FIG. 7, and FIG. 9 is a sectional view along line IX-IX of FIG. 7.

This semiconductor laser diode 40 is a Fabry-Perot laser diode including a substrate 101, a semiconductor stacked structure 102 formed by crystal growth on the substrate 101, an n-type electrode 103 formed to come into contact with the back surface of the substrate (the surface on the side opposite to the semiconductor stacked structure 102), and a p-type electrode 104 formed to come into contact with the surface of the semiconductor stacked structure 102.

The substrate 101 is formed of a GaAs monocrystalline substrate in this embodiment. The plane orientation of the surface of the GaAs substrate 101 has an off-angle of 10° with respect to a (100) plane. Each layer forming the semiconductor stacked structure 102 is subjected to epitaxial growth with respect to the substrate 101. The term "epitaxial growth" denotes crystal growth in the state of keeping lattice continuity from a ground layer. A lattice mismatch with the ground layer is absorbed by the lattice distortion of a layer that undergoes crystal growth, and lattice continuity on an interface with the ground layer is maintained.

The semiconductor stacked structure 102 includes an active layer 110, an n-type semiconductor layer 111, a p-type semiconductor layer 112, an n-side guide layer 115, and a p-side guide layer 116. The n-type semiconductor layer 111 is disposed on the substrate 101 side with respect to the active layer 110, whereas the p-type semiconductor layer 112 is disposed on the p-type electrode 104 side with respect to the active layer 110. The n-side guide layer 115 is disposed between the n-type semiconductor layer 111 and the active layer 110, whereas the p-side guide layer 116 is disposed between the active layer 110 and the p-type semiconductor layer 112. A double heterojunction is formed in this way. Electrons are injected from the n-type semiconductor layer 111 into the active layer 110 through the n-side guide layer 115, whereas electron holes are injected from the p-type semiconductor layer 112 thereinto through the p-side guide layer 116. These are recombined with each other in the active layer 110, and, as a result, light is generated.

The n-type semiconductor layer 111 is formed by stacking an n-type GaAs buffer layer 113 (for example, 100 nm in thickness) and an n-type $(Al_{x1}Ga_{(1-x1)})_{0.51}In_{0.49}P$ cladding layer $(0 \leqq x1 \leqq 1)$ 114 (for example, 3000 nm in thickness) in this order from the substrate 101 side. On the other hand, the p-type semiconductor layer 112 is formed by stacking a p-type $(Al_{x1}Ga_{(1-x1)})_{0.51}In_{0.49}P$ cladding layer $(0 \leqq x1 \leqq 1)$ 117 (for example, 1600 nm in thickness), a p-type InGaP band discontinuity relaxing layer 118 (for example, 50 nm in thickness), and a p-type GaAs contact layer 119 (for example, 300 nm in thickness) on the p-type guide layer 116.

The n-type GaAs buffer layer 113 is a layer provided to heighten adhesiveness between the GaAs substrate 101 and the n-type $(Al_{x1}Ga_{(1-x1)})_{0.51}In_{0.49}P$ cladding layer 114. The n-type GaAs buffer layer 113 is made into an n-type semiconductor layer by doping GaAs with, for example, Si serving as an n-type dopant.

The p-type GaAs contact layer 119 is a low resistive layer used to have ohmic contact with the p-type electrode 104. The p-type GaAs contact layer 119 is made into a p-type semiconductor layer by doping GaAs with, for example, Zn serving as a p-type dopant.

The n-type cladding layer 114 and the p-type cladding layer 117 generate an optical confinement effect by which light emitted from the active layer 110 is confined therebetween. The n-type $(Al_{x1}Ga_{(1-x1)})_{0.51}In_{0.49}P$ cladding layer 114 is made into an n-type semiconductor layer by doping $(Al_{x1}Ga_{(1-x1)})_{0.51}In_{0.49}P$ with, for example, Si serving as an n-type dopant. The p-type $(Al_{x1}Ga_{(1-x1)})_{0.51}In_{0.49}P$ cladding layer 117 is made into a p-type semiconductor layer by doping $(Al_{x1}Ga_{(1-x1)})_{0.51}In_{0.49}P$ with, for example, Zn serving as a p-type dopant. The n-type $(Al_{x1}Ga_{(1-x1)})_{0.51}In_{0.49}P$ cladding layer 114 has a wider band gap than the n-side guide layer 115, whereas the p-type $(Al_{x1}Ga_{(1-x1)})_{0.51}In_{0.49}P$ cladding layer 117 has a wider band gap than the p-side guide layer 116. As a result, excellent optical confinement and excellent carrier confinement can be performed, and a highly effective semiconductor laser diode can be realized.

In order to achieve a high output capability, it is important to restrain catastrophic optical damage. Therefore, it is preferable to produce an end-surface window structure 140 that widens the band gap of the active layer 110 by diffusing an impurity, such as zinc, into an end surface portion of a laser resonator, as described later. When an impurity, such as zinc, is diffused to produce the end-surface window structure 140, the diffusion velocity will be fast if a region into which the impurity is diffused contains phosphorus. In this embodiment, each of the n-type cladding layer 114 and the p-type cladding layer 117 is formed of a $(Al_{x1}Ga_{(1-x1)})_{0.51}In_{0.49}P$ layer that contains phosphorus. Therefore, an impurity, such as zinc, is easily diffused, thus making it easy to produce the end-surface window structure 140. As a result, a semiconductor laser diode suitable for a high output capability can be realized.

Additionally, in the n-type cladding layer 114 and the p-type cladding layer 117 according to this embodiment, the ratio of the composition of In to the composition of $(Al_{x1}Ga_{(1-x1)})$ is set at 0.49/0.51, and therefore a lattice match with the GaAs substrate 101 is achieved, and high-quality crystals can be obtained. As a result, a semiconductor laser device with high reliability can be obtained.

The n-side guide layer 115 is formed of an $Al_{x2}Ga_{(1-x2)}As$ $(0 \leqq x2 \leqq 1)$ layer (for example, 50 nm in thickness), and is constructed by being stacked on the n-type semiconductor layer 111. The p-side guide layer 116 is formed of an $Al_{x2}Ga_{(1-x2)}As$ $(0 \leqq x2 \leqq 1)$ layer (for example, 50 nm in thickness), and is constructed by being stacked on the active layer 110.

The n-side $Al_{x2}Ga_{(1-x2)}As$ guide layer 115 and the p-side $Al_{x2}Ga_{(1-x2)}As$ guide layer 116 are semiconductor layers that generate an optical confinement effect into the active layer 110, and form a carrier confinement structure into the active layer 110 along with the cladding layers 114, 117. Accordingly, the efficiency of recombination of electrons and electron holes in the active layer 110 is heightened.

The refractive index of $Al_{x2}Ga_{(1-x2)}As$ is changed in accordance with the composition x2 of Al. For example, if the energy of incident light (photon energy) is 1.38 eV, the refractive index (refractive index of GaAs) reaches 3.590 when x2=0, and the refractive index (refractive index of AlAs) reaches 2.971 when x2=1 (see Non-patent Document (H. C. Casey Jr., D. D. Sell, and M. B. Panish, "Refractive index of AlxGa1-xAs between 1.2 and 1.8 eV," Applied Physics Letters, Vol. 24, No. 2, pp. 63-65 (1974)). Therefore, in $Al_xGa_{(1-x)}As$, the span of adjustable range of the refractive index is wide.

$Al_{x2}Ga_{(1-x2)}As$ ($0 \leqq x2 \leqq 1$) that makes the n-side and p-side guide layers 115 and 116 has a wide span of adjustable range of the band gap (refractive index) as mentioned above, and therefore an emission beam can be easily designed. For example, a light beam whose aspect ratio in the cross section is approximately 1 can be output, i.e., a light beam whose cross section assumes substantially a circular shape can be output.

Preferably, $Al_{x2}Ga_{(1-x2)}As$ layer that makes the guide layers 115 and 116 has a composition that satisfies $x2 \geqq 0.4$. The reason is that, if x2 is smaller than 0.4, the band gap of the active layer at the end surface portion cannot be sufficiently widened even if an end-surface window structure is formed at the end surface portion of the laser resonator. This will be described later in detail.

For example, the active layer 110 has a multiple-quantum well structure (MQW structure) containing AlGaAsP, and serves to amplify light generated by a recombination of electrons and electron holes.

Figure 10:
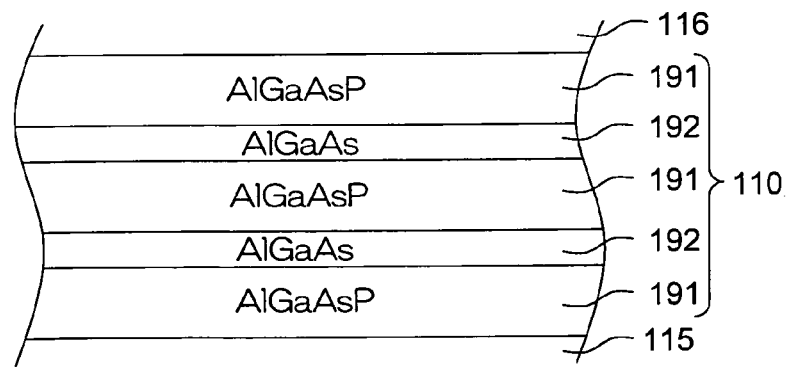
FIG. 10 is a schematic sectional view for describing a configuration of an active layer of the semiconductor laser diode.

In this embodiment, as shown in FIG. 10, the active layer 110 has a multiple-quantum well structure formed by alternately stacking a quantum well layer formed of an undoped $Al_yGa_{(1-y)}As_{(1-x3)}P_{x3}$ layer ($0 \leqq x3 \leqq 1$, $0 \leqq y \leqq 0.3$) (for example, 13 nm in thickness) 191 and a barrier layer formed of an undoped $Al_{x4}Ga_{(1-x4)}As$ layer ($0 \leqq x4 \leqq 1$) layer (for example, 7 nm in thickness) 192 repeatedly in a plurality of cycles. Since the lattice constant of the AlGaAsP layer being in a non-distortion state is smaller than that of the GaAs substrate 101, a tensile stress (tensile distortion) is caused in the quantum well layer 191 formed of the $Al_yGa_{(1-y)}As_{x3}P_{(1-x3)}$ layer. Accordingly, the semiconductor laser diode 40 can oscillate in the TM mode. Output light in the TM mode is a TM wave in which a magnetic field vector is perpendicular to a light propagation direction (an electric field vector is parallel to a light propagation direction).

Preferably, the film thickness of the quantum well layer 191 ranges from 9 nm to 14 nm. The reason is that, in order to oscillate in the TM mode, it is recommended to thicken the active layer so as to reduce relative oscillation threshold current between the TE mode and the TM mode.

When the semiconductor laser diode 40 is oscillated in the TE mode, it is recommended to reduce the composition of P of the quantum well layer 191. In that case, it is preferable to set the composition of P at zero from the viewpoint of production.

$Al_yGa_{(1-y)}As_{(1-x3)}P_{x3}$ that makes the quantum well layer 191 is smaller in the band gap than other materials, such as InGaP, used as the quantum well layer. Therefore, it is possible to enlarge a band gap difference between the cladding layers 114, 117 and the active layer 110. This makes it possible to realize a semiconductor laser diode that is excellent in temperature characteristics, i.e., a semiconductor laser diode that is small in the variation of threshold current or working current when the temperature changes.

Preferably, the $Al_yGa_{(1-y)}As_{(1-x3)}P_{x3}$ layer that forms the quantum well layer 191 has a composition in which the ratio x3/(1-x3) of the composition x3 of P to the composition (1-x3) of As satisfies 1/4 or less. The reason is that there is a fear that an increase of the composition of P will cause an increase of tensile distortion caused in the quantum well layer 191 and will cause cracks or leakage current if the ratio x3/(1-x3) is greater than 1/4.

Additionally, preferably, the $Al_yGa_{(1-y)}As_{(1-x3)}P_{x3}$ layer has a composition in which the ratio x3/(1-x3) of the composition x3 of P to the composition (1-x3) of As satisfies 1/9 or more. The reason is that the ratio of light intensity of the TM (Transverse Magnetic) mode to light intensity of the TE (Transverse Electric) mode is made higher. In order to oscillate the semiconductor laser diode 40 in the TM mode, it is necessary to cause tensile distortion in the quantum well layer 191. A greater tensile distortion can be caused in the quantum well layer 191 as the lattice constant of the quantum well layer 191 decreases. The lattice constant of the $Al_yGa_{(1-y)}As_{(1-x3)}P_{x3}$ layer that forms the quantum well layer 191 becomes smaller as the ratio of the composition of P to the composition of As increases.

As shown in FIG. 9, the p-type cladding layer 117, the p-type band discontinuity relaxing layer 118, and the p-type contact layer 119 in the p-type semiconductor layer 112 form a ridge stripe 130 by removing their respective parts. More specifically, the respective parts of the p-type cladding layer 117, the p-type band discontinuity relaxing layer 118, and the p-type contact layer 119 are removed by etching, thus forming the ridge stripe 130 substantially rectangular when viewed cross-sectionally.

The side surface of the p-type contact layer 119, the exposed surface of the p-type band discontinuity relaxing layer 118, and the exposed surface of the $(Al_{x1}Ga_{(1-x1)})_{0.51}In_{0.49}P$ cladding layer 117 are covered with a current blocking layer 106.

The semiconductor stacked structure 102 has a pair of end surfaces (cleavage surfaces) 131, 132 formed by cleavage surfaces at both ends in the longitudinal direction of the ridge stripe 130. This pair of end surfaces 131,132 are parallel to each other. In this way, a Fabry-Perot resonator is formed in which the pair of end surfaces 131, 132 are defined as resonator end surfaces, respectively, by the n-side guide layer 115, the active layer 110, and the p-side guide layer 116. In other words, light generated by the active layer 110 is amplified by induced emission while reciprocating between the resonator end surfaces 131, 132. Part of the amplified light is taken as laser light out of the resonator end surfaces 131, 132 outwardly from the device.

The length of the resonator ranges from, for example, 200 μm to 600 μm, and is 350 μm in this embodiment. The width of the chip of the semiconductor laser diode 40 ranges from, for example, 50 μm to 250 μm, and is 135 μm in this embodiment. The thickness of the chip ranges from, for example, 30 μm to 150 μm, and is 65 μm in this embodiment.

The n-type electrode 103 is made of, for example, an AuGe/Ni/Ti/Au alloy, and comes into ohmic contact with the substrate 101 so that its AuGe side is disposed on the substrate 101 side. The p-type electrode 104 is formed so as to cover the exposed surface of the p-type contact layer 119 and the exposed surface of the current blocking layer 106 therewith. The p-type electrode 104 is made of, for example, a Ti/Au alloy, and comes into ohmic contact with the p-type contact layer 119 so that its Ti side is disposed on the p-type contact layer 119.

As shown in FIG. 7 and FIG. 8, the end-surface window structure 140 that widens the band gap of the active layer 110 is formed at the end surface portion of the resonator. This end-surface window structure 140 is formed, for example, by diffusing zinc (Zn) into the end surface portion of the resonator.

The thus formed configuration makes it possible to generate a recombination of electrons and electron holes in the active layer 110 and generate light whose oscillation wavelength is, for example, 770 nm to 830 nm by connecting the n-type electrode 103 and the p-type electrode 104 to the power source and by injecting electrons and electron holes from the n-type semiconductor layer 111 and the p-type semiconductor layer 112 into the active layer 110. This light is amplified by induced emission while reciprocating between the resonator end surfaces 131, 132 along the guide layers 115, 116. As a result, even more laser output is taken out outwardly from the resonator end surface 131 that is a laser emission end surface.

Figure 11A:
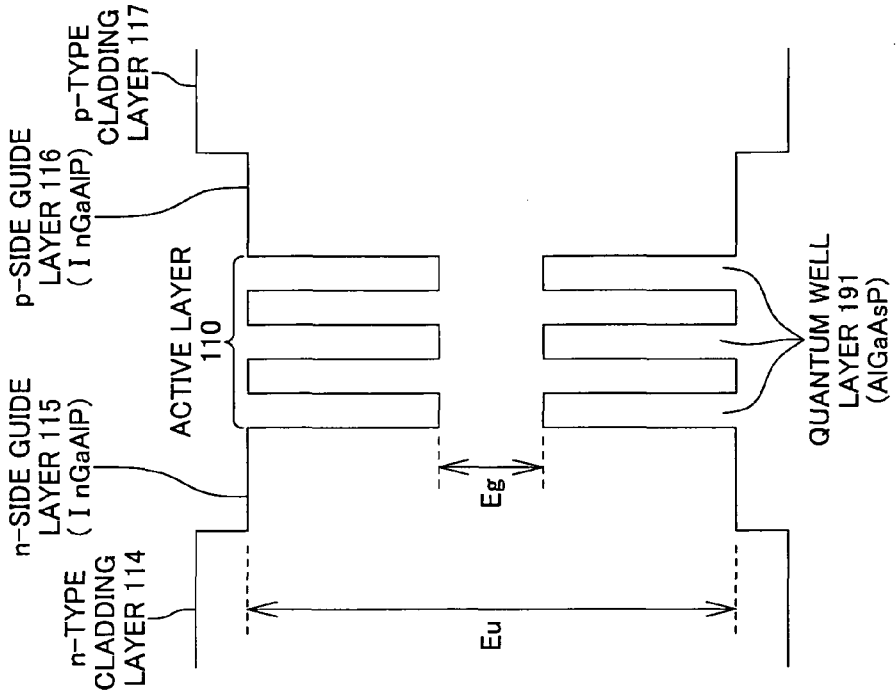
FIGS. 11A and 11B illustrate band gaps of a cladding layer, a guide layer, and an active layer.
Figure 11B:
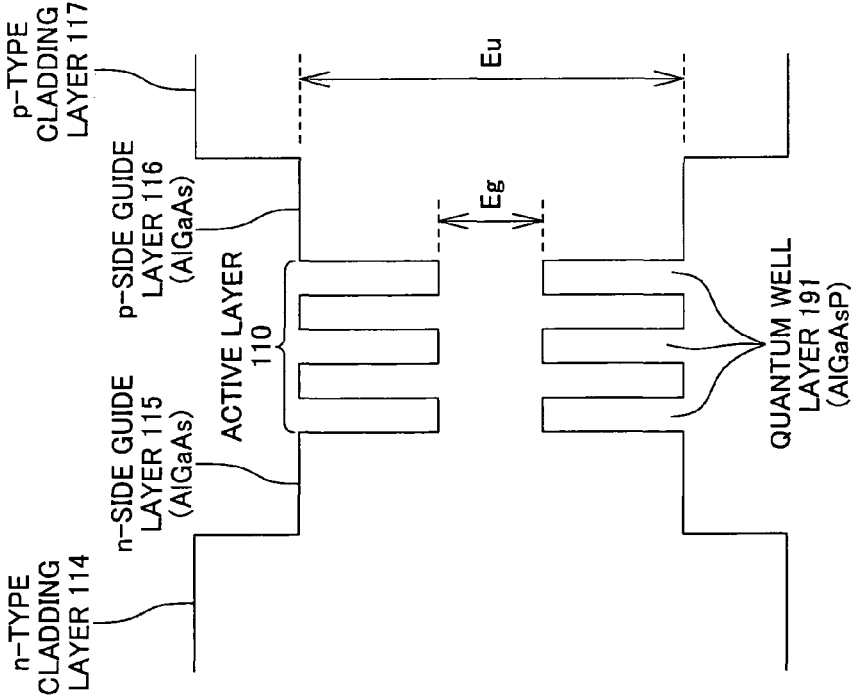

FIG. 11A is an energy band diagram for describing a band gap of each of the cladding layers 114, 117, the guide layers 115, 116, and the active layer 110. FIG. 11B is an energy band diagram for describing a band gap of each layer when the guide layer is made of InGaAlP that is a phosphorus-based compound semiconductor.

In the semiconductor laser diode 40 according to this embodiment, the quantum well layer 191 in the active layer 110 is formed of an $Al_yGa_{(1-y)}As_{(1-x3)}P_{x3}$ layer ($0 \leq x3 \leq 1$, $0 \leq y \leq 0.3$) that is an arsenic-based compound semiconductor. In the semiconductor laser diode 40 according to this embodiment, each of the cladding layers 114, 117 is made of a phosphorus-based compound semiconductor (($Al_{x1}Ga_{(1-x1)})_{0.51}In_{0.49}P$ ($0.5 \leq x1 \leq 1$)), whereas each of the guide layers 115, 116 is made of not a phosphorus-based compound semiconductor but an arsenic-based compound semiconductor ($Al_{x2}Ga_{(1-x2)}As$ ($0 \leq x2 \leq 1$)).

As comparatively shown in FIG. 11A and FIG. 11B, if the guide layers 115, 116 are made of $Al_{x2}Ga_{(1-x2)}As$ that is an arsenic-based compound semiconductor (see FIG. 11A), the band gap Eu of the guide layers 115, 116 can be made smaller than if the guide layers are made of InGaAlP that is a phosphorus-based compound semiconductor (see FIG. 11B). Therefore, in the semiconductor laser diode 40 according to this embodiment, a difference (Eu–Eg) between the band gap Eu of the guide layers 115, 116 and the band gap Eg of the quantum well layer 191 can be reduced.

In general, semiconductors are characterized in that a refractive index difference becomes smaller as the band gap difference decreases, and therefore the optical confinement effect can be prevented from being excessively heightened, and an optical density at the end surface portion of the laser resonator can be moderated. As a result, catastrophic optical damage can be restrained, and a high output capability can be achieved. Additionally, the $Al_{x2}Ga_{(1-x2)}As$ guide layers 115, 116 are higher in thermal conductivity than the guide layers made of InGaAlP, and hence also has the advantage of being capable of allowing heat to efficiently escape. This also makes it possible to stabilize the control of the semiconductor laser diode 40 and to contribute to the restraint of catastrophic optical damage.

Figure 12:
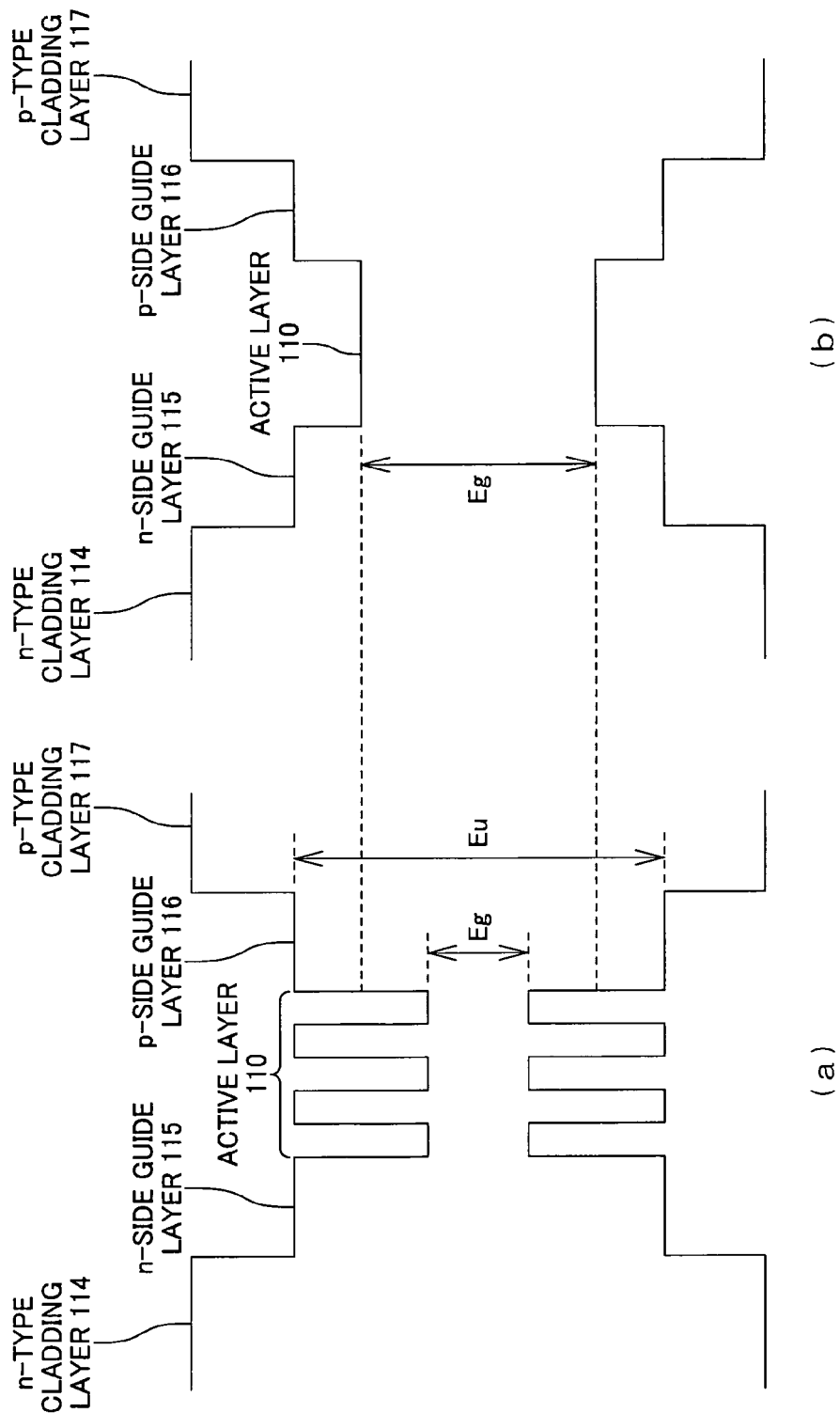
FIG. 12 illustrates band gaps of a cladding layer, a guide layer, and an active layer, (a) of FIG. 12 is an energy band diagram showing a band gap of each layer of a central part between resonator-end surfaces, and (b) of FIG. 12 is an energy band diagram showing a band gap of each layer in an end-surface window structure formed at the resonator-end surface.

(a) of FIG. 12 is an energy band diagram showing a band gap of each layer of a central part between resonator-end surfaces. (b) of FIG. 12 is an energy band diagram showing a band gap of each layer in an end-surface window structure formed at the resonator end surface.

In the above embodiment, the end-surface window structure 140 that widens the band gap of the active layer 110 is formed at the end surface portion of the resonator. Therefore, as shown in (b) of FIG. 12, the band gap Eg of the active layer 110 reaches a mean value between the band gap Eg of the active layer 110 in the central part of the resonator (see (a) of FIG. 12) and the band gap Eu of the guide layers 115, 116 (barrier layer 192) (see (a) of FIG. 12) at the end surface portion of the resonator. In other words, the band gap Eg of the active layer 110 becomes greater than that of their intermediate portions at the end surface portion of the resonator. Therefore, it becomes difficult for induced emission light generated by a recombination of electrons and electron holes inside to be absorbed at the end surface portion of the resonator, and therefore heat generation is restrained. This makes it possible to restrain the occurrence of catastrophic optical damage, and therefore a high output capability can be achieved.

The reason why the $Al_{x2}Ga_{(1-x2)}As$ layer that forms the guide layers 115, 116 preferably has a composition that satisfies the relation $x2 \geq 0.4$ will be described in detail. When the end-surface window structure 140 is produced at the end surface portion of the laser resonator, the band gap of the active layer 110 at the end surface portion reaches a mean value between the band gap of the guide layers 115, 116 and the band gap of the quantum well layer 191. Therefore, in order to sufficiently widen the band gap of the active layer 110 at the end surface portion by producing the end-surface window structure 140, the band gap of the guide layers 115, 116 is required to be greater than a predetermined value (specifically, about 1.8 eV). On the other hand, the band gap of the $Al_{x2}Ga_{(1-x2)}As$ layer that forms the guide layers 115, 116 becomes greater as the composition of Al contained therein increases, i.e., as x2 increases. Accordingly, the band gap of the guide layers 115, 116 can be made greater than the predetermined value by setting x2 at 0.4 or more.

As described above, a high output capability can be achieved in the above-mentioned semiconductor laser diode 40. As a result, the output of light guided to the waveguide 35 can be kept at more than a constant value even if the connection efficiency between the waveguide 35 and the semiconductor laser diode 40 is somewhat inadequate. Therefore, the waveguide 35 and the semiconductor laser diode 40 are not required to be positioned with high accuracy. Accordingly, the productive efficiency of the thermally assisted magnetic head 21 can be improved.

FIG. 13 to FIG. 16 are cross-sectional views showing the production method of the semiconductor laser diode 40 shown in FIG. 7 to FIG. 9.

Figure 13:
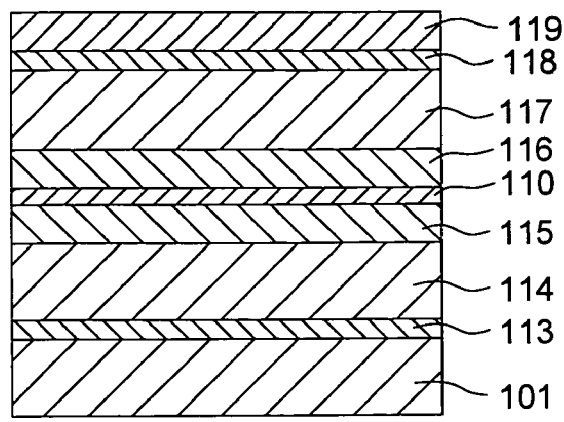
FIG. 13 is a sectional view showing a production process of a semiconductor laser diode.

First, as shown in FIG. 13, the n-type GaAs buffer layer 113, the n-type $(Al_{x1}Ga_{(1-x1)})_{0.51}In_{0.49}P$ cladding layer 114, the n-side $Al_{x2}Ga_{(1-x2)}As$ guide layer 115, the active layer 110, the p-side $Al_{x2}Ga_{(1-x2)}As$ guide layer 116, the p-type $(Al_{x1}Ga_{(1-x1)})_{0.51}In_{0.49}P$ cladding layer 117, the p-type InGaP band discontinuity relaxing layer 118, and the p-type GaAs contact layer 119 are sequentially grown on the GaAs substrate 101 according to a metal organic chemical vapor deposition method (MOCVD). The active layer 110 is formed by alternately growing the quantum well layer 191 formed of an $Al_yGa_{(1-y)}As_{(1-x3)}P_{x3}$ layer and the barrier layer 192 formed of an $Al_{x4}Ga_{(1-x4)}As$ layer repeatedly in a plurality of cycles.

Thereafter, a region that corresponds to the vicinity of the end surface of the semiconductor laser diode is subjected to patterning by ZnO (zinc oxide). Thereafter, annealing is performed, for example, for about eight hours at 500 to 650° C., and, as a result, Zn is diffused into the region that corresponds to the vicinity of the end surface of the semiconductor laser diode 40. In this case, annealing is performed so that the diffusion of Zn reaches the n-type cladding layer 114 through the active layer 110 and the n-side guide layer 115 as shown by the broken line in FIG. 8. As a result, the end-surface window structure 140 is formed in the region that corresponds to the vicinity of the end surface of the semiconductor laser diode 40.

Figure 14:
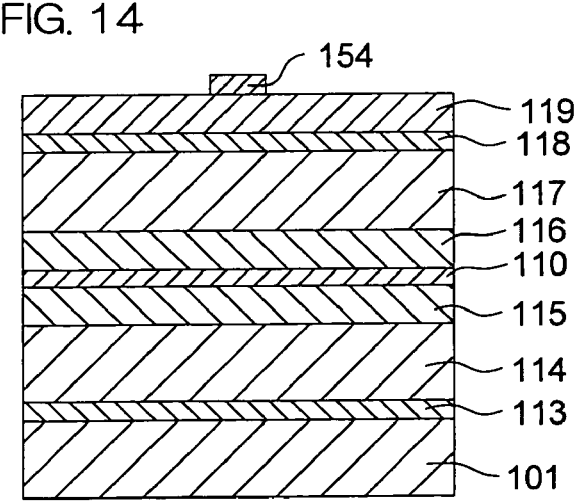
FIG. 14 is a sectional view showing a production process of a semiconductor laser diode.
Figure 15:
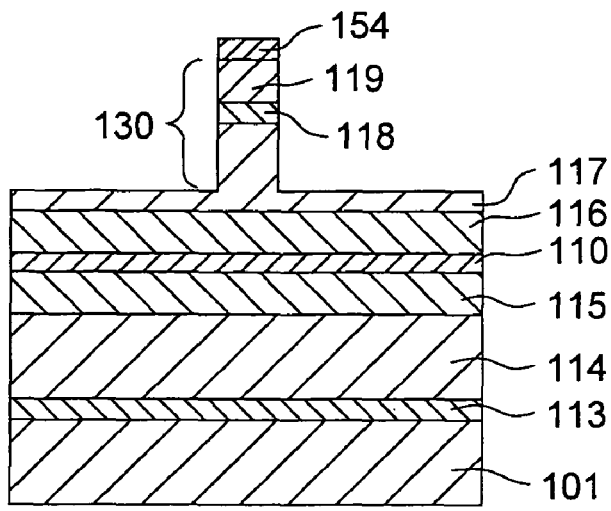
FIG. 15 is a sectional view showing a production process of a semiconductor laser diode.

Thereafter, the ZnO layer is removed. Subsequently, as shown in FIG. 14, parts of the p-type GaAs contact layer 119, the InGaP band discontinuity relaxing layer 118, and the p-type $(Al_{x1}Ga_{(1-x1)})_{0.51}In_{0.49}P$ cladding layer 117 are removed by etching while using a striped insulating film as a mask 154. As a result, the ridge stripe 130 having its top surface on which the mask layer 154 is stacked is formed as shown in FIG. 15.

Figure 16:
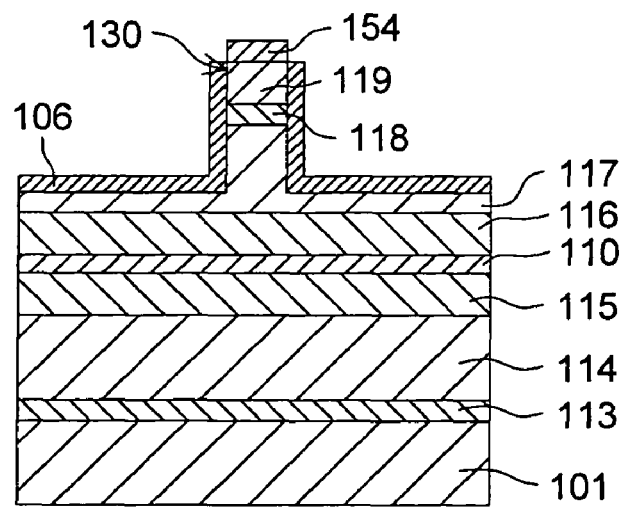
FIG. 16 is a sectional view showing a production process of a semiconductor laser diode.

Thereafter, as shown in FIG. 16, the current blocking layer 106 is deposited on the surface. At this time, the mask layer 154 functions as a mask. Therefore, the top surface of the ridge stripe 130 is not covered with the current blocking layer 106.

Thereafter, the mask layer 154 is removed. Subsequently, the p-type electrode 104 being in ohmic contact with the p-type GaAs contact layer 119 is formed so as to cover the exposed surface of the current blocking layer 106 and the exposed surface of the p-type GaAs contact layer 119. Furthermore, the n-type electrode 103 being in ohmic contact with the GaAs substrate 101 is formed.

Although a description has been given of the device having the active layer of a multiple-quantum well structure provided with a plurality of quantum well layers in the above embodiment, the structure of the active layer may be a quantum well structure having a single quantum well layer.

The thus formed semiconductor laser diode 40 emits laser light from the light-emission end surface (resonator end surface) 131 by voltage application in the thickness direction. Preferably, the oscillation wavelength of laser light emitted therefrom falls within a range of from 770 nm to 830 nm. The reason why the oscillation wavelength of the semiconductor laser diode 40 is preferably 770 nm or greater is that the absorption of light in the waveguide will become larger if the oscillation wavelength is smaller than 770 nm. The reason why the oscillation wavelength of the semiconductor laser diode 40 is preferably 830 nm or smaller is that light absorption by molecular vibrations will become larger, and the size of the waveguide (especially, size in the thickness direction) will become larger so that much time is consumed to produce the waveguide if the oscillation wavelength is greater than 830 nm.

A power supply in the hard disk drive can be used for driving of this semiconductor laser diode 40. In practice, the hard disk drive is usually equipped, for example, with the power supply of about 2 V, and can supply a sufficient voltage for the lasing operation. The power consumption of the semiconductor laser diode 40 is also, for example, approximately several ten mW, which the power supply in the hard disk drive can fully provide.

As shown in FIG. 4, the n-type electrode 103 of the semiconductor laser diode 40 is fixed to the electrode pad 47 by the solder layer 42 such as Au—Sn. More specifically, the semiconductor laser diode 40 is fixed to the light source support substrate 230 so that the light-emission end surface 131 of the semiconductor laser diode 40 is directed downwardly in FIG. 4, i.e., so that the light-emission end surface 131 becomes parallel to the bond surface 2300. In practical fixing of the semiconductor laser diode 40, for example, an evaporated film of Au—Sn alloy is deposited in the thickness of about 0.7 to 1 μm on the surface of the electrode pad 47, the laser diode 40 is then mounted thereon, and thereafter it is heated to be fixed, to about 200 to 300° C. by a hot plate or the like under a hot air blower. As shown in FIG. 2, the electrode pad 48 is electrically connected through a bonding wire to the p-type electrode 104 of the semiconductor laser diode 40. The electrode connected to the electrode pad 47 may also be the p-type electrode 104. In this case, the n-type electrode 103 is connected through a bonding wire to the electrode pad 48.

In the case of soldering with the aforementioned Au—Sn alloy, the light source unit 23 is heated, for example, to a high temperature of about 300° C., but according to the present embodiment, this light source unit 23 is produced separately from the slider 22, and therefore the magnetic head portion 32 in the slider 22 is prevented from being adversely affected by this high temperature.

The back surface 2201 of the slider 22 and the bond surface 2300 of the light source unit 23 are bonded, for example, with an adhesive layer 44 such as a UV cure type adhesive, as shown in FIG. 4. The semiconductor laser diode 40 and the waveguide 35 are arranged so that the light-emission end surface 131 of the semiconductor laser diode 40 faces the light-incidence end surface 354 of the waveguide 35 and so that the thickness direction of the semiconductor laser diode 40 coincides with the thickness direction of the waveguide 35.

Figure 17:
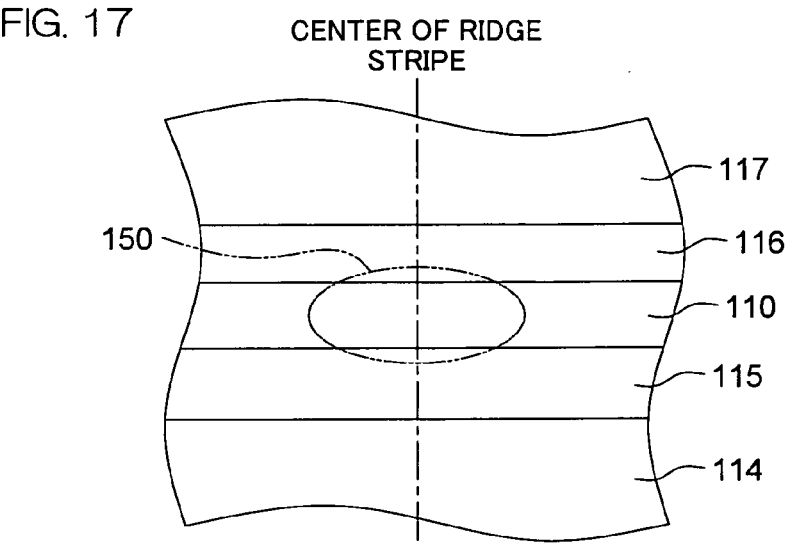
FIG. 17 is a partially enlarged cross-sectional view showing a cross-sectional shape of a light beam near the light-emission end surface of the semiconductor laser diode.

FIG. 17 is a sectional view showing a cross-sectional shape of a light beam near a light-emission end surface of the semiconductor laser diode 40. The cross-sectional shape of a light beam 150 near the light-emission end surface of the semiconductor laser diode 40 is an oblong ellipse in which the thickness direction of the semiconductor laser diode 40 indicates the direction of a minor axis. Since this semiconductor laser diode 40 oscillates in the TM mode, its output light serves as light polarized in the minor axis direction of the cross-sectional shape of the light beam 150.

From the viewpoint of assembly accuracy, it is recommended to set the distance between the light-emission end surface 131 of the semiconductor laser diode 40 and the light-incidence end surface 354 of the waveguide 35 at 1 μm or more. The distance between the light-emission end surface 131 of the semiconductor laser diode 40 and the light-incidence end surface 354 of the waveguide 35 is preferably from 1 μm to 5 μm, and, more preferably, from 1 μm to 3 μm. If the distance between the light-emission end surface 131 of the semiconductor laser diode 40 and the light-incidence end surface 354 of the waveguide 35 is 5 μm or less, the distance therebetween is short, and therefore the shape of a light beam that impinges on the light-incidence end surface of the waveguide assumes an elliptical shape in which the thickness direction of the semiconductor diode 40 is the minor axis direction in the same manner as the shape of a light beam emitted from the light-emission end surface 131 of the semiconductor laser diode 40. Additionally, since the thickness direction of the semiconductor laser diode 40 coincides with the thickness direction of the waveguide 35, light polarized in the thickness direction of the waveguide 35 can be efficiently introduced into the waveguide 35 even if the thickness of the waveguide 35 is small.

Preferably, if a semiconductor laser diode that oscillates in the TE mode is used as a semiconductor laser diode that generates light to heat the recording medium 10, the thickness direction of the semiconductor laser diode is orthogonalized with respect to the thickness direction of the waveguide 35. This arrangement of the semiconductor laser diode allows the electric field vector of output light (TE wave) of the semiconductor laser diode to coincide with the thickness direction of the waveguide 35. However, in this arrangement, the cross-sectional shape of a light beam near the light-emission end surface of the semiconductor laser diode assumes an elliptical shape in which the thickness direction of the waveguide 35 is the major axis direction. There is a need to enlarge the thickness of the waveguide 35 in order to efficiently introduce a light beam formed in such a shape into the waveguide 35, and therefore process time for producing the waveguide 35 becomes long.

Figure 18:
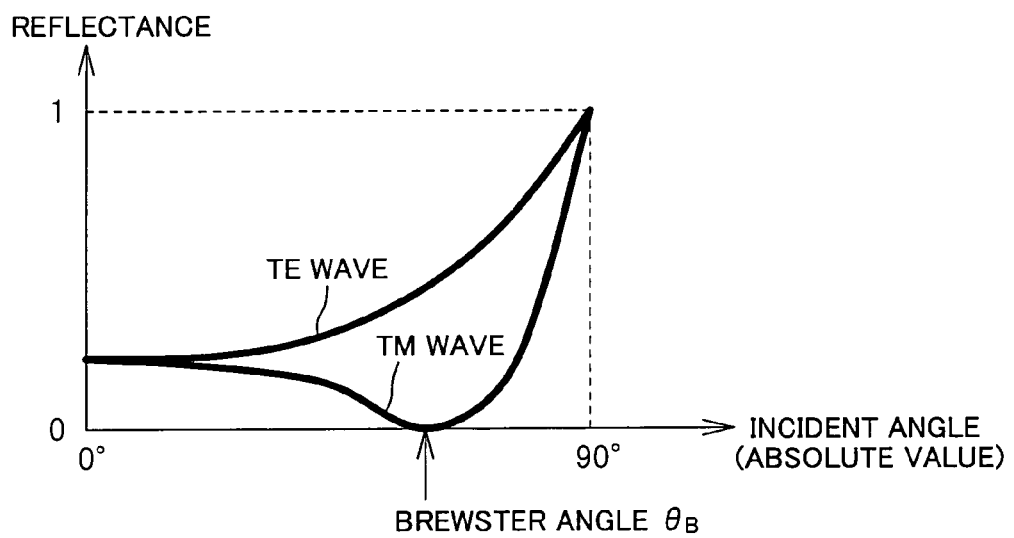
FIG. 18 is a graph for describing reflectance characteristics with respect to the incident angle of a TM wave and that of a TE wave.

FIG. 18 is a graph showing reflectance characteristics with respect to the incident angle of a TM wave and that of a TE wave.

In the semiconductor laser diode that oscillates in the TE (Transverse Electric) mode, its output light is a TE wave in which the electric field vector has a direction perpendicular to a light propagation direction, i.e., the electric field vector has a direction perpendicular to the thickness direction of the semiconductor laser diode. In the TE wave, reflectance becomes greater as the absolute value of an incident angle onto a light incidence surface rises from 0°, and reaches the maximum value when the absolute value of the incident angle reaches 90° as shown in FIG. 18.

On the other hand, in the semiconductor laser diode 40 that oscillates in the TM (Transverse Magnetic) mode as in this embodiment, its output light is a TM wave in which the electric field vector has a direction parallel to a light propagation direction, i.e., the electric field vector has a direction parallel to the thickness direction of the semiconductor laser diode 40. In the TM wave output from the semiconductor laser diode 40, reflectance is gradually reduced as the absolute value of an incident angle onto a light incidence surface rises from 0°, and reaches zero when the absolute value of the incident angle reaches a predetermined value (for example, about 58° to 69°) as shown in FIG. 18. An incident angle $\theta_B$ whose reflectance reaches zero is called "Brewster angle." The reflectance increases as the absolute value of the incident angle increases when the absolute value thereof ranges from a value corresponding to the "Brewster angle" to 90°. The reflectance reaches the maximum when the absolute value of the incident angle is 90°.

When a semiconductor laser diode that oscillates in the TE mode is used as a semiconductor laser diode that generates light to heat the recording medium 10, reflectance will become great if the incident angle of light onto the light-incidence end surface 354 of the waveguide 35 deviates from 0°, and therefore the connection efficiency between the semiconductor laser diode and the waveguide 35 is lowered. Therefore, high accuracy is required in order to position the semiconductor laser diode and the waveguide 35. As a result, it becomes difficult to raise the productive efficiency of the thermally assisted magnetic head.

In this embodiment, the semiconductor laser diode 40 that oscillates in the TM mode is used as a semiconductor laser diode that generates light to heat the recording medium 10. Therefore, in this embodiment, reflectance is reduced even if the incident angle of light onto the light-incidence end surface 354 of the waveguide 35 slightly deviates from 0°, and therefore the connection efficiency between the semiconductor laser diode 40 and the waveguide 35 is not lowered. Therefore, it is no longer necessary to position the waveguide 35 and the semiconductor laser diode 40 with high accuracy. In more detail, when the light source support substrate 230 is attached to the semiconductor laser diode 40, these two components are not required to be positioned with high accuracy, and, when the slider 22 is attached to the light source unit 23, these two components are not required to be positioned with high accuracy. As a result, the productive efficiency of the thermally assisted magnetic head 21 can be improved without sacrificing the connection efficiency.

Figure 19:
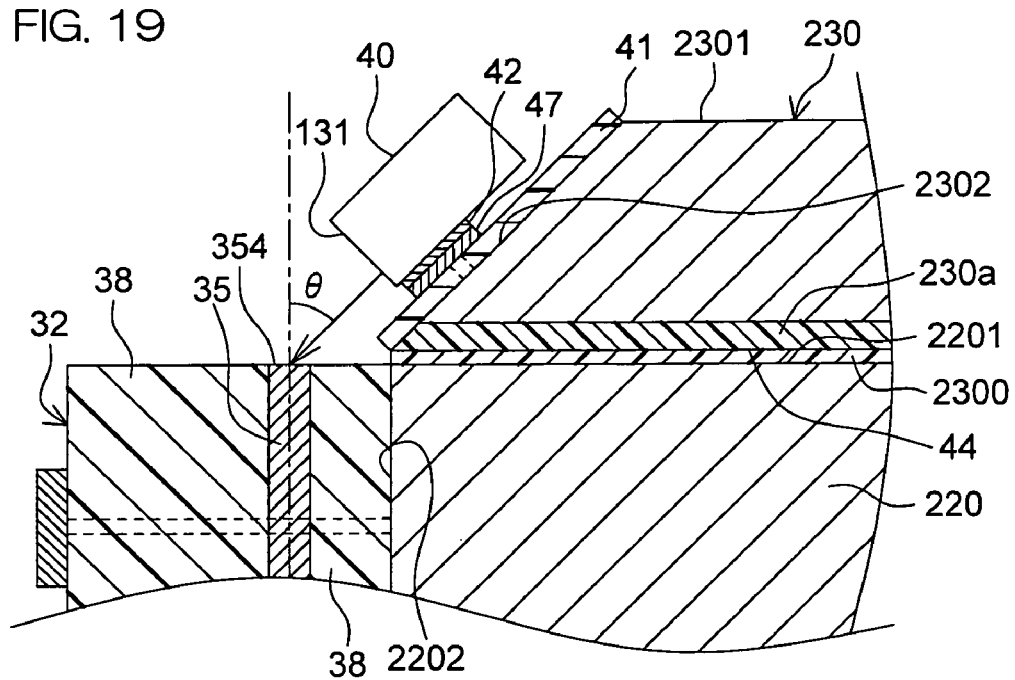
FIG. 19 is a partially sectional view showing an example in which a semiconductor laser diode and a waveguide are dis

The semiconductor laser diode 40 and the waveguide 35 may be disposed so that the incident angle $\theta$ of output light of the semiconductor laser diode 40 onto the light-incidence end surface 354 of the waveguide 35 becomes the Brewster angle as shown in FIG. 19. In more detail, the element forming surface 2302, which is a side surface when the bond surface 2300 of the light source support substrate 230 is defined as a bottom surface, is formed on an oblique surface in such a manner as to recede from the waveguide 35 as it approaches toward an upper surface 2301 when the bond surface 2300 of the light source support substrate 230 is defined as a bottom surface. The insulating layer 41 is disposed on the element forming surface 2302. The electrode pads 47, 48 are formed on the insulating layer 41. The semiconductor laser diode 40 is fixed onto the electrode pad 47, which is one of the two electrode pads, via the solder layer 42. The angle (inclination angle) between the element forming surface 2302 and the bond surface 2300 of the light source support substrate 230 is set at an angle by which the incident angle $\theta$ of output light from the semiconductor laser diode 40 with respect to the waveguide 35 becomes a Brewster angle $\theta_B$. The reflectance of the output light of the semiconductor laser diode 40 on the light-incidence end surface 354 of the waveguide 35 reaches zero by that setting, and therefore the connection efficiency between the semiconductor laser diode 40 and the waveguide 35 can be improved.

The configurations of the semiconductor laser diode 40 and the electrode pads are not always limited to those in the above-described embodiment, of course, and, for example, the semiconductor laser diode 40 may employ another configuration using other semiconductor materials if it oscillates in the TM mode. Furthermore, it is also possible to use any other brazing material, for the soldering between the semiconductor laser diode 40 and the electrode. Yet furthermore, the semiconductor laser diode 40 may be formed directly on the unit substrate by epitaxially growing the semiconductor materials.

[Production Method of Thermally Assisted Magnetic Head]

A method of producing the thermally assisted magnetic head described above will be described below briefly.

First, the slider 22 is produced. Specifically, the slider substrate 220 is prepared, the MR effect element 33 and interelement shield layer 390 are then formed by well-known methods, and the insulating layer 38 of alumina or the like is further formed as a ground layer.

Figure 20:
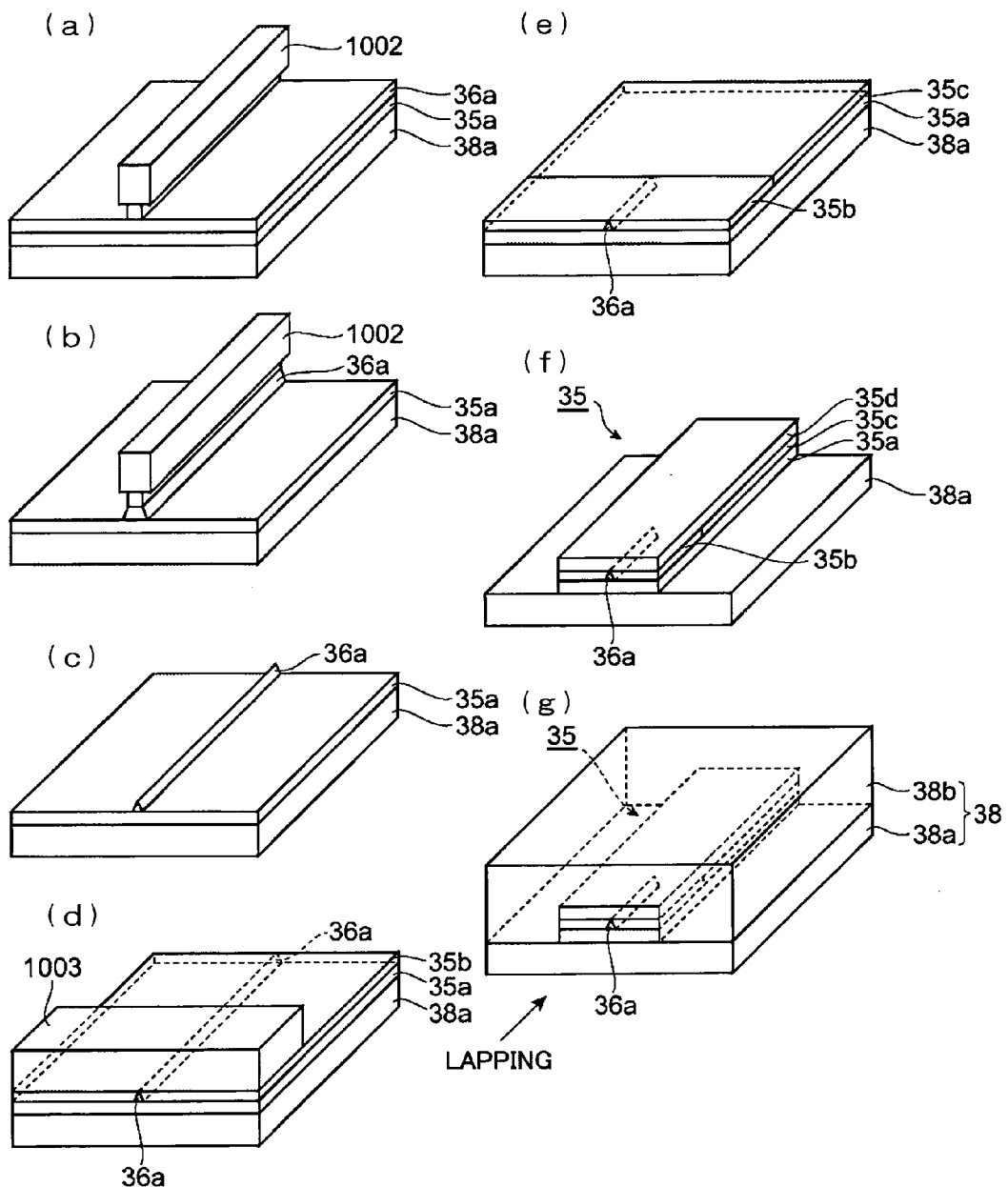
- FIG. 20 is a process drawing for describing a production method of a waveguide and a near-field light generator.

Subsequently, the waveguide 35 and near-field light generator 36 are formed. This process will be described in detail with reference to FIG. 20. FIG. 20 is a perspective view to illustrate an embodiment of the method of forming the waveguide 35 and the near-field light generator 36.

In the first step, as shown in (a) of FIG. 20, a dielectric film 35a of $Ta_2O_5$ or the like with the refractive index higher than that of the insulating layer 38a, which will be a part of the waveguide 35, is first deposited on the insulating layer 38a of $Al_2O_2$ or the like, a metal layer 36a of Au or the like then deposited thereon, and a resist pattern 1002 depressed for liftoff in the bottom part is formed thereon.

In the next step, as shown in (b) of FIG. 20, unnecessary portions of the metal layer 36a are removed except immediately below the resist pattern 1002 by ion milling or the like, thereby forming a pattern of the metal layer 36a of a trapezoid shape wider in the bottom as deposited on the dielectric film 35a.

In the subsequent step, as shown in (c) of FIG. 20, the resist pattern 1002 is removed, and a part of each slope is removed from the two slope sides of the metal layer 36a of the trapezoid shape by ion milling or the like, to form the metal layer 36a in a triangular sectional shape.

Subsequently, as shown in (d) of FIG. 20, a dielectric film 35b of the same material as the dielectric film 35a is deposited on the dielectric film 35a so as to cover the metal layer 36a, a resist pattern 1003 for formation of the end surface of the metal layer 36a is then laid on the side where the medium-facing surface S will be formed, the metal layer 36a and the dielectric film 35b are then removed by ion milling or the like, from the side opposite to the side where the medium-facing surface S will be formed, as shown in (e) of FIG. 20, and thereafter a dielectric film 35c of the same material as the dielectric film 35b is deposited on the removed portion.

Furthermore, as shown in (f) of FIG. 20, a dielectric film 35d of the same material as the dielectric film 35b is further deposited on the dielectric films 35b, 35c, and the dielectric films 35a, 35b, 35c, 35d are patterned so as to achieve a predetermined width, thereby almost completing the waveguide 35.

Thereafter, as shown in (g) of FIG. 20, an insulating layer 38b of the same material as the insulating layer 38a is further formed so as to cover the waveguide 35, thereby completing the insulating layer 38 as a cladding layer. Thereafter, lapping is performed by a predetermined distance from the side where the metal layer 36a is exposed, as described later, to form the near-field light generator 36 of the predetermined thickness and the medium-facing surface S. The above steps can form the waveguide 35 with the near-field light generator 36 therein.

After that, the electromagnetic coil element 34 is formed by the well-known method as shown in FIG. 4, and then the insulating layer 38 of alumina or the like is formed. Furthermore, the electrode pads 371 and others for connection are formed and thereafter lapping of the air bearing surface and the back surface thereof is performed to complete the slider 22. After this step, tests of the electromagnetic coil element 34 and the MR effect element 33 of the slider 22 are conducted for each slider, to select a nondefective product.

Subsequently, the light source unit 23 is produced. In the first step, as shown in FIG. 4, the light source support substrate 230 of AlTiC or the like is prepared, the heat insulation layer 230a, insulating layer 41, and electrode pads 47, 48 are then formed on the surfaces of the substrate by well-known methods, the semiconductor laser diode 40 is then fixed on the electrode pad 47 by an electrically conductive solder material 42, such as Au—Sn, and thereafter the substrate is shaped into a predetermined size by separation by cutting or the like. This completes the light source unit 23. The light source unit 23 obtained in this manner is also subjected to characteristic evaluation of the semiconductor laser diode 40, particularly, observation of a profile of drive current by a high-temperature continuous conduction test, to select one considered to have a sufficiently long lifetime.

After that, as shown in (a) of FIG. 21, a UV cure type adhesive 44a is applied onto either or both of the bond surface 2300 of the light source unit 23 as a nondefective unit and the back surface 2201 of the slider 22 as a nondefective unit. The UV cure type adhesive can be a UV cure type epoxy resin, a UV cure type acrylic resin, or the like.

Then, as shown in (b) of FIG. 21, the bond surface 2300 of the light source unit 23 and the back surface 2201 of the slider 22 are laid on each other, and then the semiconductor laser diode 40 is activated with application of a voltage between the electrode pads 47, 48. Along therewith, a photodetector DT is opposed to the light-emission end surface 353 of the waveguide 35, and the light source unit 23 and the slider 22 are relatively moved in directions of arrows in (b) of FIG. 21 to find out a position where the output from the photodetector DT becomes maximum. At that position, UV light is applied from the outside onto the UV cure type adhesive to cure the UV cure type adhesive 44a. As a result, the light source unit 23 and the slider 22 can be bonded to each other in a state in which the optical axis of the semiconductor laser diode 40 is aligned with the optical axis of the waveguide 35.

[Operation]

The operation of the thermally assisted magnetic head 21 according to the present embodiment will be described below. During a writing or reading operation, the thermally assisted magnetic head 21 hydromechanically floats up by a predetermined levitation amount above the surface of the rotating magnetic disk (medium) 10. On this occasion, the ends on the medium-facing surface S side of the MR effect element 33 and the electromagnetic coil element 34 are opposed through a small spacing to the magnetic disk 10, thereby implementing readout by sensing of a data signal magnetic field and writing by application of a data signal magnetic field.

On the occasion of writing of a data signal, the laser light having propagated from the light source unit 23 through the waveguide 35 reaches the near-field light generator 36, whereupon the near-field light generator 36 generates the near-field light. This near-field light enables execution of thermally assisted magnetic recording as described below.

Here the near-field light generally has the maximum intensity at the border of the near-field light generator 36 when viewed from the medium-facing surface S, although it depends upon the wavelength of the incident laser light and the shape of the waveguide 35. The semiconductor laser diode 40 oscillates in the TM mode as described above, and therefore an electric field vector of light output therefrom coincides with the thickness direction of the semiconductor laser diode 40. In FIG. 4, the thickness direction of the semiconductor laser diode 40 and the thickness direction of the waveguide 35 coincide with the horizontal direction in FIG. 4, and the electric field vector of the light arriving at the near-field light generator 36 is the horizontal direction in FIG. 4, i.e., the vertical direction in FIG. 5. Therefore, radiation of the strongest near-field light occurs near the vertex 36c. In other words, the part facing the vicinity of this vertex 36c becomes a major heat-acting portion in the thermal assist action to heat a portion of the recording layer of the magnetic disk with light.

Since the electric field intensity of this near-field light is immeasurably stronger than that of the incident light, this very strong near-field light rapidly heats the opposed local part of the surface of the magnetic disk. This reduces the coercive force of this local part to a level allowing writing with the writing magnetic field, whereby writing with the electromagnetic coil element 34 becomes feasible even with use of the magnetic disk of a high coercive force for high-density recording.

The near-field light penetrates to the depth of about 10 to 30 nm from the medium-facing surface S toward the surface of the magnetic disk. Therefore, under the present circumstances where the levitation amount is 10 nm or less, the near-field light can reach the recording layer part sufficiently. The width in the track width direction and the width in the medium moving direction of the near-field light generated in this manner are approximately equal to the aforementioned reach depth of the near-field light, and the electric field intensity of this near-field light exponentially decreases with increase in the distance. Therefore, the near-field light can heat the recording layer part of the magnetic disk in an extremely localized area.

By adopting the thermally assisted magnetic recording method as described above, it also becomes feasible to achieve, for example, the recording density of 1 Tbits/in$^2$ order, by performing writing on the magnetic disk of a high coercive force by means of the thin film magnetic head for perpendicular magnetic recording to record recording bits in an extremely fine size.

Although the embodiment of the present invention has been described in detail as above, the embodiment is merely a concrete example used to clarify the technical contents of the present invention, and the present invention should be interpreted without being limited to the concrete example, and the scope of the present invention should be defined by the scope of the appended claims only.

What is claimed is:

1. A thermally assisted magnetic head comprising:
    a slider that has a magnetic head portion facing a recording medium;
    a semiconductor laser device that oscillates in a TM mode and that generates light for heating the recording medium;
    a magnetic recording element that is disposed at the magnetic head portion and that generates a magnetic field for magnetic recording; and
    a waveguide that is disposed at the magnetic head portion, that has a light-incidence end surface facing a light-emission end surface of the semiconductor laser device, and that guides light from the semiconductor laser device to a surface of the recording medium;
    wherein the semiconductor laser device comprises:
    a p-type cladding layer and an n-type cladding layer;
    a p-side guide layer and an n-side guide layer both of which are placed between the p-type cladding layer and the n-type cladding layer; and
    an active layer that is placed between the p-side guide layer and the n-side guide layer and that includes at least one quantum well layer;
    wherein the p-type cladding layer and the n-type cladding layer are each formed of a $(Al_{x1}Ga_{(1-x1)})_{0.51}In_{0.49}P$ layer ($0 \leq x1 \leq 1$);
    the p-side guide layer and the n-side guide layer are each formed of an $Al_{x2}Ga_{(1-x2)}As$ layer ($0 \leq x2 \leq 1$);
    the quantum well layer is formed of an $Al_yGa_{(1-y)}As_{(1-x3)}P_{x3}$ layer ($0 \leq x3 \leq 1$, $0 \leq y \leq 0.3$); and
    the $Al_yGa_{(1-y)}As_{(1-x3)}P_{x3}$ layer has a composition in which the ratio $x3/(1-x3)$ of the composition x3 of P to the composition (1-x3) of As satisfies 1/4 or less.

2. The thermally assisted magnetic head according to claim 1, wherein the $Al_{x2}Ga_{(1-x2)}As$ layer has a composition that satisfies $x2 \geq 0.4$.

3. The thermally assisted magnetic head according to claim 1, wherein the $Al_yGa_{(1-y)}As_{(1-x3)}P_{x3}$ layer has a composition in which the ratio $x3/(1-x3)$ of the composition x3 of P to the composition (1-x3) of As satisfies from 1/9 to 1/4.

4. The thermally assisted magnetic head according to claim 1, wherein an oscillation wavelength is from 770 nm to 830 nm, and a film thickness of the quantum well layer is from 9 nm to 14 nm.

5. The thermally assisted magnetic head according to claim 1, wherein an end-surface window structure that widens a band gap of the active layer is formed at an end surface portion of a laser resonator.

6. The thermally assisted magnetic head according to claim 1, wherein the waveguide and the semiconductor laser device are disposed so that a thickness direction of the semiconductor laser device coincides with a thickness direction of the waveguide, and a cross-sectional shape of a light beam in the light-emission end surface of the semiconductor laser device is an elliptical shape in which the thickness direction of the semiconductor laser device is a minor axis direction.

7. The thermally assisted magnetic head according to claim 1, wherein the waveguide and the semiconductor laser device are disposed so that an incident angle of output light of the semiconductor laser device onto the light-incidence end surface of the waveguide becomes a Brewster angle.

8. The thermally assisted magnetic head according to claim 1, wherein a distance between the light-emission end surface of the semiconductor laser device and the light-incidence end surface of the waveguide is 5 μm or less.

* * * * *